(12) United States Patent
Heikura et al.

(10) Patent No.: US 9,973,228 B2
(45) Date of Patent: May 15, 2018

(54) ANTENNA APPARATUS WITH AN INTEGRATED PROXIMITY SENSOR AND METHODS

(71) Applicant: Pulse Finland OY, Oulusalo (FI)

(72) Inventors: Ilkka Heikura, Kempele (FI); Heikki Korva, Tupos (FI)

(73) Assignee: Pulse Finland Oy, Oulu (FI)

( * ) Notice: Subject to any disclaimer, the term of this patent is extended or adjusted under 35 U.S.C. 154(b) by 90 days.

(21) Appl. No.: 14/836,736

(22) Filed: Aug. 26, 2015

(65) Prior Publication Data

US 2016/0065260 A1 Mar. 3, 2016

Related U.S. Application Data

(63) Continuation-in-part of application No. 14/566,584, filed on Dec. 10, 2014.
(Continued)

(30) Foreign Application Priority Data

Aug. 21, 2015 (KR) .................. 10-2015-0118236

(51) Int. Cl.
*H04B 1/3827* (2015.01)
*H01Q 1/44* (2006.01)
(Continued)

(52) U.S. Cl.
CPC ............ *H04B 1/3838* (2013.01); *H01Q 1/44* (2013.01); *H01Q 5/378* (2015.01); *H01Q 9/42* (2013.01)

(58) Field of Classification Search
CPC .................................................. H01Q 1/243
See application file for complete search history.

(56) References Cited

U.S. PATENT DOCUMENTS 2,745,102 A 5/1956 Norgorden
3,938,161 A 2/1976 Sanford
(Continued)

FOREIGN PATENT DOCUMENTS

CN  1316797      10/2007
CN  101958455 A  1/2011
(Continued)

OTHER PUBLICATIONS

"Dual Band Antenna for Hand Held Portable Telephones", Liu et al., Electronics Letters, vol. 32, No. 7, 1996, pp. 609-610.
(Continued)

*Primary Examiner* — Jermele M Hollington
*Assistant Examiner* — Feba Pothen
(74) *Attorney, Agent, or Firm* — Gazdzinski & Associates, PC

(57) ABSTRACT

Wireless wide area network (WWAN) antenna with integrated sensor and methods of using the same. In one embodiment, an antenna subsystem and proximity sensing subsystem share a grounded antenna component/parasitic element. The parasitic element can be used to broaden the operating band of the antenna feeding component and provide an input (via a capacitance change) to a proximity sensor. The parasitic element is, in one embodiment, coupled in parallel to the proximity sensor allowing for a reduction in noise due to increased isolation between the antenna subsystem and the sensing subsystem.

25 Claims, 15 Drawing Sheets

Related U.S. Application Data

(60) Provisional application No. 62/042,020, filed on Aug. 26, 2014.

(51) Int. Cl.
*H01Q 9/42* (2006.01)
*H01Q 5/378* (2015.01)

(56) References Cited

U.S. PATENT DOCUMENTS

| | | |
|---|---|---|
| 4,004,228 A | 1/1977 | Mullett |
| 4,028,652 A | 6/1977 | Wakino et al. |
| 4,031,468 A | 6/1977 | Ziebell et al. |
| 4,054,874 A | 10/1977 | Oltman |
| 4,069,483 A | 1/1978 | Kaloi |
| 4,123,756 A | 10/1978 | Nagata et al. |
| 4,123,758 A | 10/1978 | Shibano et al. |
| 4,131,893 A | 12/1978 | Munson et al. |
| 4,201,960 A | 5/1980 | Skutta et al. |
| 4,255,729 A | 3/1981 | Fukasawa et al. |
| 4,313,121 A | 1/1982 | Campbell et al. |
| 4,356,492 A | 10/1982 | Kaloi |
| 4,370,657 A | 1/1983 | Kaloi |
| 4,423,396 A | 12/1983 | Makimoto et al. |
| 4,431,977 A | 2/1984 | Sokola et al. |
| 4,546,357 A | 10/1985 | Laughon et al. |
| 4,559,508 A | 12/1985 | Nishikawa et al. |
| 4,625,212 A | 11/1986 | Oda et al. |
| 4,653,889 A | 3/1987 | Bizouard et al. |
| 4,661,992 A | 4/1987 | Garay et al. |
| 4,692,726 A | 9/1987 | Green et al. |
| 4,703,291 A | 10/1987 | Nishikawa et al. |
| 4,706,050 A | 11/1987 | Andrews |
| 4,716,391 A | 12/1987 | Moutrie et al. |
| 4,740,765 A | 4/1988 | Ishikawa et al. |
| 4,742,562 A | 5/1988 | Kommrusch |
| 4,761,624 A | 8/1988 | Igarashi et al. |
| 4,800,348 A | 1/1989 | Rosar et al. |
| 4,800,392 A | 1/1989 | Garay et al. |
| 4,821,006 A | 4/1989 | Ishikawa et al. |
| 4,823,098 A | 4/1989 | DeMuro et al. |
| 4,827,266 A | 5/1989 | Sato et al. |
| 4,829,274 A | 5/1989 | Green et al. |
| 4,835,538 A | 5/1989 | McKenna et al. |
| 4,835,541 A | 5/1989 | Johnson et al. |
| 4,862,181 A | 8/1989 | PonceDeLeon et al. |
| 4,879,533 A | 11/1989 | De Muro et al. |
| 4,896,124 A | 1/1990 | Schwent |
| 4,907,006 A | 3/1990 | Nishikawa et al. |
| 4,954,796 A | 9/1990 | Green et al. |
| 4,965,537 A | 10/1990 | Kommrusch |
| 4,977,383 A | 12/1990 | Niiranen |
| 4,980,694 A | 12/1990 | Hines |
| 5,016,020 A | 5/1991 | Simpson |
| 5,017,932 A | 5/1991 | Ushiyama et al. |
| 5,043,738 A | 8/1991 | Shapiro et al. |
| 5,047,739 A | 9/1991 | Kuokkanene |
| 5,053,786 A | 10/1991 | Silverman et al. |
| 5,057,847 A | 10/1991 | Vaeisaenen |
| 5,061,939 A | 10/1991 | Nakase |
| 5,097,236 A | 3/1992 | Wakino et al. |
| 5,103,197 A | 4/1992 | Turunen |
| 5,109,536 A | 4/1992 | Kommrusch |
| 5,155,493 A | 10/1992 | Thursby et al. |
| 5,157,363 A | 10/1992 | Puurunen |
| 5,159,303 A | 10/1992 | Flink |
| 5,166,697 A | 11/1992 | Viladevall et al. |
| 5,170,173 A | 12/1992 | Krenz et al. |
| 5,203,021 A | 4/1993 | Repplinger et al. |
| 5,210,510 A | 5/1993 | Karsikas |
| 5,210,542 A | 5/1993 | Pett et al. |
| 5,220,335 A | 6/1993 | Huang |
| 5,229,777 A | 7/1993 | Doyle |
| 5,239,279 A | 8/1993 | Turunen |
| 5,278,528 A | 1/1994 | Turunen |
| 5,281,326 A | 1/1994 | Galla |
| 5,298,873 A | 3/1994 | Ala-Kojola |
| 5,302,924 A | 4/1994 | Jantunen |
| 5,304,968 A | 4/1994 | Ohtonen |
| 5,307,036 A | 4/1994 | Turunen |
| 5,319,328 A | 6/1994 | Turunen |
| 5,349,315 A | 9/1994 | Ala-Kojola |
| 5,349,700 A | 9/1994 | Parker |
| 5,351,023 A | 9/1994 | Niiranen |
| 5,354,463 A | 10/1994 | Turunen |
| 5,355,142 A | 10/1994 | Marshall et al. |
| 5,357,262 A | 10/1994 | Blaese |
| 5,363,114 A | 11/1994 | Shoemaker |
| 5,369,782 A | 11/1994 | Kawano et al. |
| 5,382,959 A | 1/1995 | Pett et al. |
| 5,386,214 A | 1/1995 | Sugawara |
| 5,387,886 A | 2/1995 | Takalo |
| 5,394,162 A | 2/1995 | Korovesis et al. |
| RE34,898 E | 4/1995 | Turunen |
| 5,408,206 A | 4/1995 | Turunen |
| 5,418,508 A | 5/1995 | Puurunen |
| 5,432,489 A | 7/1995 | Yrjola |
| 5,438,697 A | 8/1995 | Fowler et al. |
| 5,440,315 A | 8/1995 | Wright et al. |
| 5,442,280 A | 8/1995 | Baudart |
| 5,442,366 A | 8/1995 | Sanford |
| 5,444,453 A | 8/1995 | Lalezari |
| 5,467,065 A | 11/1995 | Turunen |
| 5,473,295 A | 12/1995 | Turunen |
| 5,506,554 A | 4/1996 | Ala-Kojola |
| 5,508,668 A | 4/1996 | Prokkola |
| 5,510,802 A | 4/1996 | Tsuru et al. |
| 5,517,683 A | 5/1996 | Collett et al. |
| 5,521,561 A | 5/1996 | Yrjola |
| 5,526,003 A | 6/1996 | Ogawa et al. |
| 5,532,703 A | 7/1996 | Stephens et al. |
| 5,541,560 A | 7/1996 | Turunen |
| 5,541,617 A | 7/1996 | Connolly et al. |
| 5,543,764 A | 8/1996 | Turunen |
| 5,550,519 A | 8/1996 | Korpela |
| 5,557,287 A | 9/1996 | Pottala et al. |
| 5,557,292 A | 9/1996 | Nygren et al. |
| 5,566,441 A | 10/1996 | Marsh et al. |
| 5,570,071 A | 10/1996 | Ervasti |
| 5,585,771 A | 12/1996 | Ervasti |
| 5,585,810 A | 12/1996 | Tsuru et al. |
| 5,589,844 A | 12/1996 | Belcher et al. |
| 5,594,395 A | 1/1997 | Niiranen |
| 5,604,471 A | 2/1997 | Rattila |
| 5,627,502 A | 5/1997 | Ervasti |
| 5,649,316 A | 7/1997 | Prudhomme et al. |
| 5,668,561 A | 9/1997 | Perrotta et al. |
| 5,675,301 A | 10/1997 | Nappa |
| 5,689,221 A | 11/1997 | Niiranen |
| 5,694,135 A | 12/1997 | Dikun et al. |
| 5,696,517 A | 12/1997 | Kawahata et al. |
| 5,703,600 A | 12/1997 | Burrell et al. |
| 5,709,823 A | 1/1998 | Hayes et al. |
| 5,711,014 A | 1/1998 | Crowley et al. |
| 5,717,368 A | 2/1998 | Niiranen |
| 5,731,749 A | 3/1998 | Yrjola |
| 5,734,305 A | 3/1998 | Ervasti |
| 5,734,350 A | 3/1998 | Deming et al. |
| 5,734,351 A | 3/1998 | Ojantakanen |
| 5,736,965 A * | 4/1998 | Mosebrook ............ H01Q 1/007 315/312 |
| 5,739,735 A | 4/1998 | Pyykko |
| 5,742,259 A | 4/1998 | Annamaa |
| 5,757,327 A | 5/1998 | Yajima et al. |
| 5,760,746 A | 6/1998 | Kawahata |
| 5,764,190 A | 6/1998 | Murch et al. |
| 5,767,809 A | 6/1998 | Chuang et al. |
| 5,768,217 A | 6/1998 | Sonoda et al. |
| 5,777,581 A | 7/1998 | Lilly et al. |
| 5,777,585 A | 7/1998 | Tsuda et al. |
| 5,793,269 A | 8/1998 | Ervasti |
| 5,797,084 A | 8/1998 | Tsuru et al. |
| 5,812,094 A | 9/1998 | Maldonado |
| 5,815,048 A | 9/1998 | Ala-Kojola |

(56) References Cited

U.S. PATENT DOCUMENTS

| | | |
|---|---|---|
| 5,822,705 A | 10/1998 | Lehtola |
| 5,852,421 A | 12/1998 | Maldonado |
| 5,861,854 A | 1/1999 | Kawahata et al. |
| 5,874,926 A | 2/1999 | Tsuru et al. |
| 5,880,697 A | 3/1999 | McCarrick et al. |
| 5,886,668 A | 3/1999 | Pedersen et al. |
| 5,892,490 A | 4/1999 | Asakura et al. |
| 5,903,820 A | 5/1999 | Hagstrom |
| 5,905,475 A | 5/1999 | Annamaa |
| 5,920,290 A | 7/1999 | McDonough et al. |
| 5,926,139 A | 7/1999 | Korisch |
| 5,929,813 A | 7/1999 | Eggleston |
| 5,936,583 A | 8/1999 | Tadahiko et al. |
| 5,943,016 A | 8/1999 | Snyder, Jr. et al. |
| 5,952,975 A | 9/1999 | Pedersen et al. |
| 5,959,583 A | 9/1999 | Funk |
| 5,963,180 A | 10/1999 | Leisten |
| 5,966,097 A | 10/1999 | Fukasawa et al. |
| 5,970,393 A | 10/1999 | Khorrami et al. |
| 5,977,710 A | 11/1999 | Kuramoto et al. |
| 5,986,606 A | 11/1999 | Kossiavas et al. |
| 5,986,608 A | 11/1999 | Korisch et al. |
| 5,990,848 A | 11/1999 | Annamaa |
| 5,999,132 A | 12/1999 | Kitchener et al. |
| 6,005,529 A | 12/1999 | Hutchinson |
| 6,006,419 A | 12/1999 | Vandendolder et al. |
| 6,008,764 A | 12/1999 | Ollikainen |
| 6,009,311 A | 12/1999 | Killion et al. |
| 6,014,106 A | 1/2000 | Annamaa |
| 6,016,130 A | 1/2000 | Annamaa |
| 6,023,608 A | 2/2000 | Yrjola |
| 6,031,496 A | 2/2000 | Kuittinen et al. |
| 6,034,637 A | 3/2000 | McCoy et al. |
| 6,037,848 A | 3/2000 | Alila |
| 6,043,780 A | 3/2000 | Funk et al. |
| 6,052,096 A | 4/2000 | Tsuru et al. |
| 6,072,434 A | 6/2000 | Papatheodorou |
| 6,078,231 A | 6/2000 | Pelkonen |
| 6,091,363 A | 7/2000 | Komatsu et al. |
| 6,091,365 A | 7/2000 | Anders et al. |
| 6,097,345 A | 8/2000 | Walton |
| 6,100,849 A | 8/2000 | Tsubaki et al. |
| 6,112,108 A | 8/2000 | Tepper et al. |
| 6,121,931 A | 9/2000 | Levi et al. |
| 6,133,879 A | 10/2000 | Grangeat et al. |
| 6,134,421 A | 10/2000 | Lee et al. |
| 6,140,966 A | 10/2000 | Pankinaho |
| 6,140,973 A | 10/2000 | Annamaa |
| 6,147,650 A | 11/2000 | Kawahata et al. |
| 6,157,819 A | 12/2000 | Vuokko |
| 6,177,908 B1 | 1/2001 | Kawahata |
| 6,185,434 B1 | 2/2001 | Hagstrom |
| 6,190,942 B1 | 2/2001 | Wilm et al. |
| 6,195,049 B1 | 2/2001 | Kim et al. |
| 6,204,826 B1 | 3/2001 | Rutkowski et al. |
| 6,215,376 B1 | 4/2001 | Hagstrom |
| 6,218,989 B1 | 4/2001 | Schneider et al. |
| 6,246,368 B1 | 6/2001 | Deming et al. |
| 6,252,552 B1 | 6/2001 | Tarvas et al. |
| 6,252,554 B1 | 6/2001 | Isohatala |
| 6,255,994 B1 | 7/2001 | Saito |
| 6,259,029 B1 | 7/2001 | Hand |
| 6,268,831 B1 | 7/2001 | Sanford |
| 6,281,848 B1 | 8/2001 | Nagumo et al. |
| 6,297,776 B1 | 10/2001 | Pankinaho |
| 6,304,220 B1 | 10/2001 | Herve et al. |
| 6,308,720 B1 | 10/2001 | Modi |
| 6,316,975 B1 | 11/2001 | O'Toole et al. |
| 6,323,811 B1 | 11/2001 | Tsubaki |
| 6,326,921 B1 | 12/2001 | Egorov et al. |
| 6,337,663 B1 | 1/2002 | Chi-Ming |
| 6,340,954 B1 | 1/2002 | Annamaa et al. |
| 6,342,859 B1 | 1/2002 | Kurz et al. |
| 6,343,208 B1 | 1/2002 | Ying |
| 6,346,914 B1 | 2/2002 | Annamaa |
| 6,348,892 B1 | 2/2002 | Annamaa |
| 6,353,443 B1 | 2/2002 | Ying |
| 6,366,243 B1 | 4/2002 | Isohatala |
| 6,377,827 B1 | 4/2002 | Rydbeck |
| 6,380,905 B1 | 4/2002 | Annamaa |
| 6,396,444 B1 | 5/2002 | Goward |
| 6,404,394 B1 | 6/2002 | Hill |
| 6,417,813 B1 | 7/2002 | Durham et al. |
| 6,421,014 B1 | 7/2002 | Sanad |
| 6,423,915 B1 | 7/2002 | Winter |
| 6,429,818 B1 | 8/2002 | Johnson et al. |
| 6,452,551 B1 | 9/2002 | Chen |
| 6,452,558 B1 | 9/2002 | Saitou et al. |
| 6,456,249 B1 | 9/2002 | Johnson et al. |
| 6,459,413 B1 | 10/2002 | Tseng et al. |
| 6,462,716 B1 | 10/2002 | Kushihi |
| 6,469,673 B2 | 10/2002 | Kaiponen |
| 6,473,056 B2 | 10/2002 | Annamaa |
| 6,476,767 B2 | 11/2002 | Aoyama et al. |
| 6,476,769 B1 | 11/2002 | Lehtola |
| 6,480,155 B1 | 11/2002 | Eggleston |
| 6,483,462 B2 | 11/2002 | Weinberger |
| 6,498,586 B2 | 12/2002 | Pankinaho |
| 6,501,425 B1 | 12/2002 | Nagumo |
| 6,515,625 B1 | 2/2003 | Johnson |
| 6,518,925 B1 | 2/2003 | Annamaa |
| 6,529,168 B2 | 3/2003 | Mikkola |
| 6,529,749 B1 | 3/2003 | Hayes et al. |
| 6,535,170 B2 | 3/2003 | Sawamura et al. |
| 6,538,604 B1 | 3/2003 | Isohatala |
| 6,538,607 B2 | 3/2003 | Barna |
| 6,542,050 B1 | 4/2003 | Arai et al. |
| 6,549,167 B1 | 4/2003 | Yoon |
| 6,552,686 B2 | 4/2003 | Ollikainen et al. |
| 6,556,812 B1 | 4/2003 | Pennanen et al. |
| 6,566,944 B1 | 5/2003 | Pehlke |
| 6,580,396 B2 | 6/2003 | Lin |
| 6,580,397 B2 | 6/2003 | Kuriyama et al. |
| 6,600,449 B2 | 7/2003 | Onaka |
| 6,603,430 B1 | 8/2003 | Hill et al. |
| 6,606,016 B2 | 8/2003 | Takamine et al. |
| 6,611,235 B2 | 8/2003 | Barna et al. |
| 6,614,400 B2 | 9/2003 | Egorov |
| 6,614,401 B2 | 9/2003 | Onaka et al. |
| 6,614,405 B1 | 9/2003 | Mikkoken |
| 6,634,564 B2 | 10/2003 | Kuramochi |
| 6,636,181 B2 | 10/2003 | Asano |
| 6,639,564 B2 | 10/2003 | Johnson |
| 6,646,606 B2 | 11/2003 | Mikkola |
| 6,650,295 B2 | 11/2003 | Ollikainen et al. |
| 6,657,593 B2 | 12/2003 | Nagumo et al. |
| 6,657,595 B1 | 12/2003 | Phillips et al. |
| 6,670,926 B2 | 12/2003 | Miyasaka |
| 6,677,903 B2 | 1/2004 | Wang |
| 6,680,705 B2 | 1/2004 | Tan et al. |
| 6,683,573 B2 | 1/2004 | Park |
| 6,693,594 B2 | 2/2004 | Pankinaho et al. |
| 6,717,551 B1 | 4/2004 | Desclos et al. |
| 6,727,857 B2 | 4/2004 | Mikkola |
| 6,734,825 B1 | 5/2004 | Guo et al. |
| 6,734,826 B1 | 5/2004 | Dai et al. |
| 6,738,022 B2 | 5/2004 | Varjakka |
| 6,741,214 B1 | 5/2004 | Kadambi et al. |
| 6,753,813 B2 | 6/2004 | Kushihi |
| 6,759,989 B2 | 7/2004 | Tarvas et al. |
| 6,765,536 B2 | 7/2004 | Phillips et al. |
| 6,774,853 B2 | 8/2004 | Wong et al. |
| 6,781,545 B2 | 8/2004 | Sung |
| 6,801,166 B2 | 10/2004 | Mikkola |
| 6,801,169 B1 | 10/2004 | Chang et al. |
| 6,806,835 B2 | 10/2004 | Iwai |
| 6,819,287 B2 | 11/2004 | Sullivan et al. |
| 6,819,293 B2 | 11/2004 | Antonius Johannes et al. |
| 6,825,818 B2 | 11/2004 | Toncich |
| 6,836,249 B2 | 12/2004 | Kenoun et al. |
| 6,847,329 B2 | 1/2005 | Ikegaya et al. |
| 6,856,293 B2 | 2/2005 | Bordi |
| 6,862,437 B1 | 3/2005 | McNamara |
| 6,862,441 B2 | 3/2005 | Ella |

(56) References Cited

U.S. PATENT DOCUMENTS

| | | | |
|---|---|---|---|
| 6,873,291 B2 | 3/2005 | Aoyama |
| 6,876,329 B2 | 4/2005 | Milosavljevic |
| 6,882,317 B2 | 4/2005 | Koskiniemi |
| 6,891,507 B2 | 5/2005 | Kushihi et al. |
| 6,897,810 B2 | 5/2005 | Dai et al. |
| 6,900,768 B2 | 5/2005 | Iguchi et al. |
| 6,903,692 B2 | 6/2005 | Kivekas |
| 6,911,945 B2 | 6/2005 | Korva |
| 6,922,171 B2 | 7/2005 | Annamaa |
| 6,925,689 B2 | 8/2005 | Folkmar |
| 6,927,729 B2 | 8/2005 | Legay |
| 6,937,196 B2 | 8/2005 | Korva |
| 6,950,065 B2 | 9/2005 | Ying et al. |
| 6,950,066 B2 | 9/2005 | Hendler et al. |
| 6,950,068 B2 | 9/2005 | Bordi |
| 6,950,072 B2 | 9/2005 | Miyata et al. |
| 6,952,144 B2 | 10/2005 | Javor |
| 6,952,187 B2 | 10/2005 | Annamaa |
| 6,958,730 B2 | 10/2005 | Nagumo et al. |
| 6,961,544 B1 | 11/2005 | Hagstrom |
| 6,963,308 B2 | 11/2005 | Korva |
| 6,963,310 B2 | 11/2005 | Horita et al. |
| 6,967,618 B2 | 11/2005 | Ojantakanen |
| 6,975,278 B2 | 12/2005 | Song et al. |
| 6,980,158 B2 | 12/2005 | Iguchi et al. |
| 6,985,108 B2 | 1/2006 | Mikkola |
| 6,992,543 B2 | 1/2006 | Luetzelschwab et al. |
| 6,995,710 B2 | 2/2006 | Sugimoto et al. |
| 7,023,341 B2 | 4/2006 | Stilp |
| 7,031,744 B2 | 4/2006 | Kojinna et al. |
| 7,034,752 B2 | 4/2006 | Sekiguchi et al. |
| 7,042,403 B2 | 5/2006 | Colburn et al. |
| 7,053,841 B2 | 5/2006 | Ponce De Leon et al. |
| 7,054,671 B2 | 5/2006 | Kaiponen et al. |
| 7,057,560 B2 | 6/2006 | Erkocevic |
| 7,061,430 B2 | 6/2006 | Zheng et al. |
| 7,081,857 B2 | 7/2006 | Kinnunen et al. |
| 7,084,831 B2 | 8/2006 | Takagi et al. |
| 7,099,690 B2 | 8/2006 | Milosavljevic |
| 7,113,133 B2 | 9/2006 | Chen et al. |
| 7,119,749 B2 | 10/2006 | Miyata et al. |
| 7,126,546 B2 | 10/2006 | Annamaa |
| 7,129,893 B2 | 10/2006 | Otaka et al. |
| 7,136,019 B2 | 11/2006 | Mikkola |
| 7,136,020 B2 | 11/2006 | Yamaki |
| 7,142,824 B2 | 11/2006 | Kojima et al. |
| 7,148,847 B2 | 12/2006 | Yuanzhu |
| 7,148,849 B2 | 12/2006 | Lin |
| 7,148,851 B2 | 12/2006 | Takaki et al. |
| 7,170,464 B2 | 1/2007 | Tang et al. |
| 7,176,838 B1 | 2/2007 | Kinezos |
| 7,180,455 B2 | 2/2007 | Oh et al. |
| 7,193,574 B2 | 3/2007 | Chiang et al. |
| 7,205,942 B2 | 4/2007 | Wang et al. |
| 7,215,283 B2 | 5/2007 | Boyle |
| 7,218,280 B2 | 5/2007 | Annamaa |
| 7,218,282 B2 | 5/2007 | Humpfer et al. |
| 7,224,313 B2 | 5/2007 | McKinzie, III et al. |
| 7,230,574 B2 | 6/2007 | Johnson |
| 7,233,775 B2 | 6/2007 | De Graauw |
| 7,237,318 B2 | 7/2007 | Annamaa |
| 7,256,743 B2 | 8/2007 | Korva |
| 7,274,334 B2 | 9/2007 | O'Riordan et al. |
| 7,283,097 B2 | 10/2007 | Wen et al. |
| 7,289,064 B2 | 10/2007 | Cheng |
| 7,292,200 B2 | 11/2007 | Posluszny et al. |
| 7,319,432 B2 | 1/2008 | Andersson |
| 7,330,153 B2 | 2/2008 | Rentz |
| 7,333,067 B2 | 2/2008 | Hung et al. |
| 7,339,528 B2 | 3/2008 | Wang et al. |
| 7,340,286 B2 | 3/2008 | Kempele |
| 7,345,634 B2 | 3/2008 | Ozkar et al. |
| 7,352,326 B2 | 4/2008 | Korva |
| 7,355,270 B2 | 4/2008 | Hasebe et al. |
| 7,358,902 B2 | 4/2008 | Erkocevic |
| 7,375,695 B2 | 5/2008 | Ishizuka et al. |
| 7,381,774 B2 | 6/2008 | Bish et al. |
| 7,382,319 B2 | 6/2008 | Kawahata et al. |
| 7,385,556 B2 | 6/2008 | Chung et al. |
| 7,388,543 B2 | 6/2008 | Vance |
| 7,391,378 B2 | 6/2008 | Mikkola |
| 7,405,702 B2 | 7/2008 | Annamaa et al. |
| 7,417,588 B2 | 8/2008 | Castany et al. |
| 7,418,990 B2 | 9/2008 | Vylasek |
| 7,423,592 B2 | 9/2008 | Pros et al. |
| 7,432,860 B2 | 10/2008 | Huynh |
| 7,439,929 B2 | 10/2008 | Ozkar |
| 7,443,344 B2 | 10/2008 | Boyle |
| 7,468,700 B2 | 12/2008 | Milosavljevic |
| 7,468,709 B2 | 12/2008 | Niemi |
| 7,501,983 B2 | 3/2009 | Mikkola |
| 7,502,598 B2 | 3/2009 | Kronberger |
| 7,564,413 B2 | 7/2009 | Kim et al. |
| 7,589,678 B2 | 9/2009 | Nissinen et al. |
| 7,616,158 B2 | 11/2009 | Mark et al. |
| 7,633,449 B2 | 12/2009 | Oh |
| 7,663,551 B2 | 2/2010 | Nissinen |
| 7,679,565 B2 | 3/2010 | Sorvala |
| 7,692,543 B2 | 4/2010 | Copeland |
| 7,710,325 B2 | 5/2010 | Cheng |
| 7,724,204 B2 | 5/2010 | Annamaa |
| 7,760,146 B2 | 7/2010 | Ollikainen |
| 7,764,245 B2 | 7/2010 | Loyet |
| 7,786,938 B2 | 8/2010 | Sorvala |
| 7,800,544 B2 | 9/2010 | Thornell-Pers |
| 7,830,327 B2 | 11/2010 | He |
| 7,843,397 B2 | 11/2010 | Boyle |
| 7,889,139 B2 | 2/2011 | Hobson et al. |
| 7,889,143 B2 | 2/2011 | Milosavljevic |
| 7,901,617 B2 | 3/2011 | Taylor |
| 7,903,035 B2 | 3/2011 | Mlkkola et al. |
| 7,916,086 B2 | 3/2011 | Koskiniemi et al. |
| 7,963,347 B2 | 6/2011 | Pabon |
| 7,973,720 B2 | 7/2011 | Sorvala |
| 8,049,670 B2 | 11/2011 | Jung et al. |
| 8,054,232 B2 | 11/2011 | Chiang et al. |
| 8,077,032 B1 * | 12/2011 | Vier ............... G08B 13/2491 |
| | | 340/3.1 |
| 8,098,202 B2 | 1/2012 | Annamaa et al. |
| 8,179,322 B2 | 5/2012 | Nissinen |
| 8,193,998 B2 | 6/2012 | Puente et al. |
| 8,378,892 B2 | 2/2013 | Sorvala |
| 8,466,756 B2 | 6/2013 | Milosavljevic et al. |
| 8,473,017 B2 | 6/2013 | Milosavljevic et al. |
| 8,564,485 B2 | 10/2013 | Milosavljevic et al. |
| 8,629,813 B2 | 1/2014 | Milosavljevic |
| 9,203,154 B2 | 12/2015 | Korva |
| 2001/0050636 A1 | 12/2001 | Weinberger |
| 2002/0183013 A1 | 12/2002 | Auckland et al. |
| 2002/0196192 A1 | 12/2002 | Nagumo et al. |
| 2003/0146873 A1 | 8/2003 | Blancho |
| 2004/0090378 A1 | 5/2004 | Dai et al. |
| 2004/0137950 A1 | 7/2004 | Bolin et al. |
| 2004/0145525 A1 | 7/2004 | Annabi et al. |
| 2004/0171403 A1 | 9/2004 | Mikkola |
| 2005/0055164 A1 | 3/2005 | Neff et al. |
| 2005/0057401 A1 | 3/2005 | Yuanzhu |
| 2005/0159131 A1 | 7/2005 | Shibagaki et al. |
| 2005/0176481 A1 | 8/2005 | Jeong |
| 2006/0071857 A1 | 4/2006 | Pelzer |
| 2006/0192723 A1 | 8/2006 | Harada |
| 2007/0042615 A1 | 2/2007 | Liao |
| 2007/0082789 A1 | 4/2007 | Nissila |
| 2007/0152881 A1 | 7/2007 | Chan |
| 2007/0188388 A1 | 8/2007 | Feng |
| 2008/0059106 A1 | 3/2008 | Wight |
| 2008/0088511 A1 | 4/2008 | Sorvala |
| 2008/0096492 A1 | 4/2008 | Yoon |
| 2008/0174494 A1 * | 7/2008 | Suzuki ............... H01Q 1/2208 |
| | | 343/700 MS |
| 2008/0266199 A1 | 10/2008 | Milosavljevic |
| 2009/0009415 A1 | 1/2009 | Tanska |
| 2009/0135066 A1 | 5/2009 | Raappana et al. |
| 2009/0153412 A1 | 6/2009 | Chiang et al. |

(56) References Cited

U.S. PATENT DOCUMENTS

| | | | |
|---|---|---|---|
| 2009/0174604 A1 | 7/2009 | Keskitalo | |
| 2009/0196160 A1 | 8/2009 | Crombach | |
| 2009/0197654 A1 | 8/2009 | Teshima | |
| 2009/0231213 A1 | 9/2009 | Ishimiya | |
| 2010/0220016 A1 | 9/2010 | Nissinen | |
| 2010/0244978 A1 | 9/2010 | Milosavljevic | |
| 2010/0309092 A1 | 12/2010 | Lambacka | |
| 2011/0045786 A1 | 2/2011 | Leinonen et al. | |
| 2011/0133994 A1 | 6/2011 | Korva | |
| 2011/0279232 A1* | 11/2011 | Tuttle | G06K 19/0723 340/10.1 |
| 2012/0052820 A1 | 3/2012 | Lin et al. | |
| 2012/0057388 A1* | 3/2012 | Garrity | H02M 3/338 363/144 |
| 2012/0062424 A1 | 3/2012 | Hwang | |
| 2012/0093046 A1 | 4/2012 | Tikka et al. | |
| 2012/0098588 A1* | 4/2012 | Ujvari | H03K 17/955 327/517 |
| 2012/0119955 A1 | 5/2012 | Milosavljevic et al. | |
| 2012/0329407 A1 | 12/2012 | Rousu et al. | |
| 2013/0109370 A1 | 5/2013 | Rowson et al. | |
| 2013/0127670 A1 | 5/2013 | Desclos et al. | |
| 2013/0137487 A1 | 5/2013 | Sato | |
| 2013/0241780 A1 | 9/2013 | Amm et al. | |
| 2014/0071008 A1* | 3/2014 | Desclos | H01Q 1/243 343/745 |
| 2014/0087673 A1* | 3/2014 | Mostov | H03F 1/0227 455/78 |
| 2014/0106684 A1 | 4/2014 | Burns et al. | |
| 2014/0192845 A1 | 7/2014 | Szini et al. | |
| 2014/0307354 A1 | 10/2014 | Watanabe | |
| 2014/0333494 A1* | 11/2014 | Huang | H01Q 1/002 343/720 |
| 2014/0362038 A1* | 12/2014 | Murakami | G06F 3/0416 345/174 |
| 2015/0022403 A1* | 1/2015 | Lin | H01Q 1/44 343/702 |
| 2015/0091762 A1* | 4/2015 | Hsiao | H01Q 1/243 343/702 |
| 2015/0200447 A1 | 7/2015 | Tang et al. | |
| 2016/0173172 A1 | 6/2016 | Greene et al. | |

FOREIGN PATENT DOCUMENTS

| | | |
|---|---|---|
| DE | 10104862 | 8/2002 |
| DE | 10150149 | 4/2003 |
| EP | 0 208 424 | 1/1987 |
| EP | 0 376 643 | 4/1990 |
| EP | 0 751 043 | 4/1997 |
| EP | 0 807 988 | 11/1997 |
| EP | 0 831 547 | 3/1998 |
| EP | 0 851 530 | 7/1998 |
| EP | 1 294 048 | 1/1999 |
| EP | 1 014 487 | 6/2000 |
| EP | 1 024 553 | 8/2000 |
| EP | 1 067 627 | 1/2001 |
| EP | 0 923 158 | 9/2002 |
| EP | 1 329 980 | 7/2003 |
| EP | 1 361 623 | 11/2003 |
| EP | 1 406 345 | 4/2004 |
| EP | 1 453 137 | 9/2004 |
| EP | 1 220 456 | 10/2004 |
| EP | 1 467 456 | 10/2004 |
| EP | 1 753 079 | 2/2007 |
| FI | 20020829 | 11/2003 |
| FI | 118782 | 3/2008 |
| FR | 2553584 | 10/1983 |
| FR | 2724274 | 3/1996 |
| FR | 2873247 | 1/2006 |
| GB | 2266997 | 11/1993 |
| GB | 2360422 | 9/2001 |
| GB | 2389246 | 12/2003 |
| JP | 59-202831 | 11/1984 |
| JP | 60-206304 | 10/1985 |
| JP | 61-245704 | 11/1986 |
| JP | 06-152463 | 5/1994 |
| JP | 07-131234 | 5/1995 |
| JP | 07-221536 | 8/1995 |
| JP | 07-249923 | 9/1995 |
| JP | 07-307612 | 11/1995 |
| JP | 08-216571 | 8/1996 |
| JP | 09-083242 | 3/1997 |
| JP | 09-260934 | 10/1997 |
| JP | 09-307344 | 11/1997 |
| JP | 10-028013 | 1/1998 |
| JP | 10-107671 | 4/1998 |
| JP | 10-173423 | 6/1998 |
| JP | 10-209733 | 8/1998 |
| JP | 10-224142 | 8/1998 |
| JP | 10-322124 | 12/1998 |
| JP | 10-327011 | 12/1998 |
| JP | 11-004113 | 1/1999 |
| JP | 11-004117 | 1/1999 |
| JP | 11-068456 | 3/1999 |
| JP | 11-127010 | 5/1999 |
| JP | 11-127014 | 5/1999 |
| JP | 11-136025 | 5/1999 |
| JP | 11-355033 | 12/1999 |
| JP | 2000-278028 | 10/2000 |
| JP | 2001-053543 | 2/2001 |
| JP | 2001-267833 | 9/2001 |
| JP | 2001-217631 | 10/2001 |
| JP | 2001-326513 | 11/2001 |
| JP | 2002-319811 | 10/2002 |
| JP | 2002-329541 | 11/2002 |
| JP | 2002-335117 | 11/2002 |
| JP | 2003-060417 | 2/2003 |
| JP | 2003-124730 | 4/2003 |
| JP | 2003-179426 | 6/2003 |
| JP | 2004-112028 | 4/2004 |
| JP | 2004-363859 | 12/2004 |
| JP | 2005-005985 | 1/2005 |
| JP | 2005-252661 | 9/2005 |
| KR | 20010080521 | 10/2001 |
| KR | 20020096016 | 12/2002 |
| KR | 20130133853 A | 12/2013 |
| SE | 511900 | 12/1999 |
| TW | M460421 U | 8/2013 |
| WO | WO 1992/000635 | 1/1992 |
| WO | WO 1996/027219 | 9/1996 |
| WO | WO 1998/001919 | 1/1998 |
| WO | WO 1999/030479 | 6/1999 |
| WO | WO 2001/020718 | 3/2001 |
| WO | WO 2001/029927 | 4/2001 |
| WO | WO 2001/033665 | 5/2001 |
| WO | WO 2001/061781 | 8/2001 |
| WO | WO 2004/017462 | 2/2004 |
| WO | WO 2004/057697 | 7/2004 |
| WO | WO 2004/100313 | 11/2004 |
| WO | WO 2004/112189 | 12/2004 |
| WO | WO 2005/062416 | 7/2005 |
| WO | WO 2007/012697 | 2/2007 |
| WO | WO 2010/122220 | 10/2010 |

OTHER PUBLICATIONS

"Improved Bandwidth of Microstrip Antennas using Parasitic Elements," IEE Proc. vol. 127, Pt. H. No. 4, Aug. 1980.

C. R. Rowell and R. D. Murch, "A compact PIFA suitable for dual frequency 900/1800-MHz operation," *IEEE Trans. Antennas Propag.*, vol. 46, No. 4, pp. 596-598, Apr. 1998.

European Office Action, dated May 30, 2005 issued during prosecution of EP 04 396 001.2-1248.

Examination Report dated May 3, 2006 issued by the EPO for European Patent Application No. 04 396 079.8.

F.R. Hsiao, et al. "A dual-band planar inverted-F patch antenna with a branch-line slit," *Microwave Opt. Technol. Lett.*, vol. 32, Feb. 20, 2002.

Griffin, Donald W. et al., "Electromagnetic Design Aspects of Packages for Monolithic Microwave Integrated Circuit-Based Arrays with Integrated Antenna Elements", IEEE Transactions on Antennas and Propagation, vol. 43, No. 9, pp. 927-931, Sep. 1995.

(56) References Cited

OTHER PUBLICATIONS

Hoon Park, et al. "Design of an Internal antenna with wide and multiband characteristics for a mobile handset", *IEEE Microw. & Opt. Tech. Lett.* vol. 48, No. 5, May 2006.

Hoon Park, et al. "Design of Planar Inverted-F Antenna With Very Wide Impedance Bandwidth", *IEEE Microw. & Wireless Comp., Lett.*, vol. 16, No. 3, pp. 113-115-, Mar. 2006.

I. Ang, Y. X. Guo, and Y. W. Chia, "Compact internal quad-band antenna for mobile phones" *Micro. Opt. Technol. Lett.*, vol. 38, No. 3 pp. 217-223 Aug. 2003.

International Preliminary Report on Patentability for International Application No. PCT/FI2004/000554, dated May 1, 2006.

Kim, B. C., J. H. Yun, and H. D. Choi, "Small wideband PIFA for mobile phones at 1800 MHz," *IEEE International Conference on Vehicular Technology*, 27{29, Daejeon, South Korea, May 2004.

Lindberg., P. and E. Ojefors, "A bandwidth enhancement technique for mobile handset antennas using wavetraps," *IEEE Transactions on Antennas and Propagation*, vol. 54, 2226{2232, 2006.

Marta Martinez- Vazquez, et al., "Integrated Planar Multiband Antennas for Personal Communication Handsets", *IEEE Trasactions on Antennas and propagation*, vol. 54, No. 2, Feb. 2006.

P. Ciais, et al., "Compact Internal Multiband Antennas for Mobile and WLAN Standards", *Electronic Letters*, vol. 40, No. 15, pp. 920-921, Jul. 2004.

P. Ciais, R. Staraj, G. Kossiavas, and C. Luxey, "Design of an internal quadband antenna for mobile phones", *IEEE Microwave Wireless Comp. Lett.*, vol. 14, No. 4, pp. 148-150, Apr. 2004.

Papapolymerou, loannis et al., "Micromachined Patch Antennas", IEEE Transactions on Antennas and Propagation, vol. 46, No. 2, pp. 275-283, Feb. 1998.

Wang, H.; "Dual-Resonance Monopole Antenna with Tuning Stubs"; IEEE Proceedings, Microwaves, Antennas & Propagation, vol. 153, No. 4, Aug. 2006; pp. 395-399.

Wong, K., et al.; "A Low-Profile Planar Monopole Antenna for Multiband Operation of Mobile Handsets"; IEEE Transactions on Antennas and Propagation, Jan. '03, vol. 51, No. 1.

Lin, Sheng-Yu; Liu, Hsien-Wen; Weng, Chung-Hsun; and Yang, Chang-Fa, "A miniature Coupled loop Antenna to be Embedded in a Mobile Phone for Penta-band Application," Progress in Electromagnetics Research Symposium Proceedings, Xi'an, China, Mar. 22-26, 2010, pp. 721-724.

Joshi, Ravi K., et al., "Broadband Concentric Rings Fractal Slot Antenna", XXVIIIth General Assembly of International Union of Radio Science (URSI). (Oct. 23-29, 2005), 4 Pgs.

Singh, Rajender, "Broadband Planar Monopole Antennas," M. Tech credit seminar report, Electronic Systems group, EE Dept, IIT Bombay, Nov. 2003, pp. 1-24.

Gobien, Andrew, T. "Investigation of Low Profile Antenna Designs for Use in Hand-Held Radios," Ch. 3, *The Inverted-L Antenna and Variations*; Aug. 1997, pp. 42-76.

"LTE—an introduction," Ericsson White Paper, Jun. 2009, pp. 1-16.

Chi, Yun-Wen, et al. "Quarter-Wavelength Printed Loop Antenna With an Internal Printed Matching Circuit for GSM/DCS/PCS/UMTS Operation in the Mobile Phone," IEEE Transactions on Antennas and Propagation, vol. 57, No. 9m Sep. 2009, pp. 2541-2547.

Extended European Search Report dated Jan. 30, 2013, issued by the EPO for EP Patent Application No. 12177740.3.

\* cited by examiner

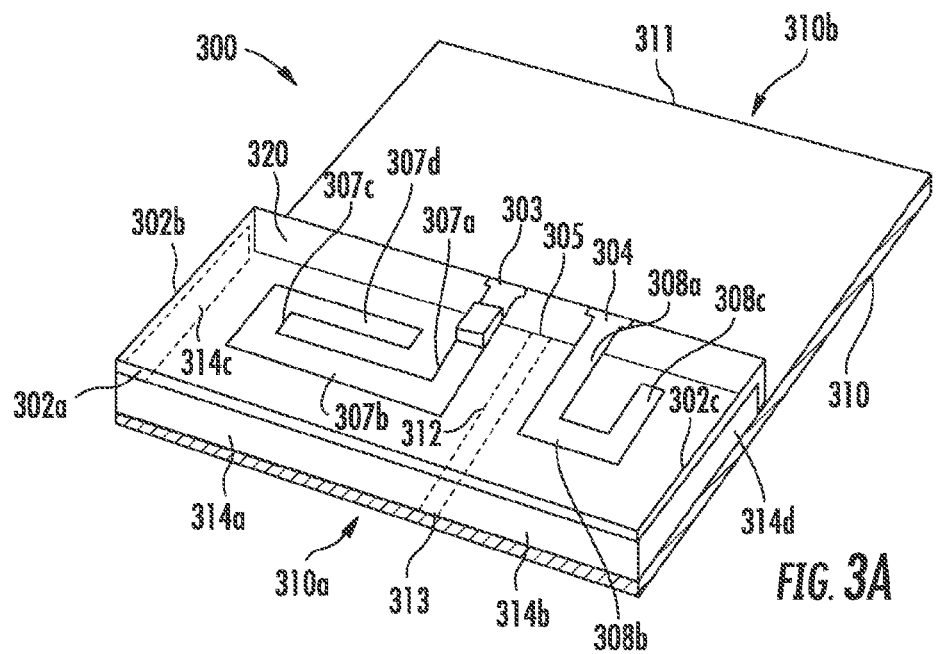
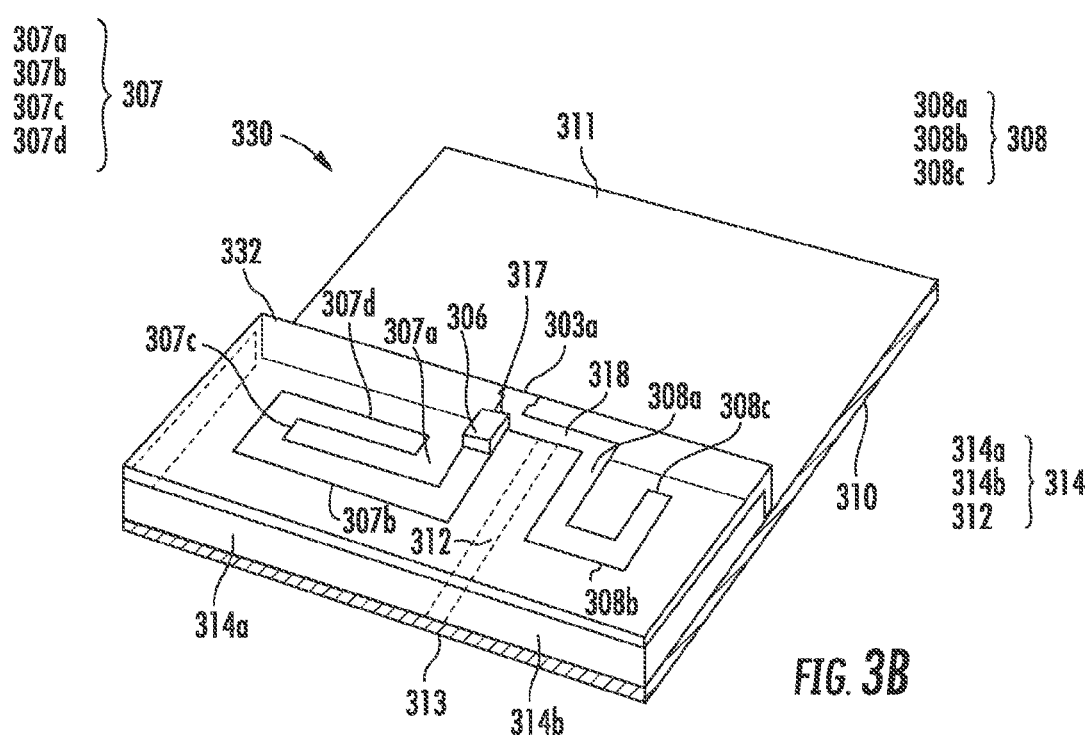

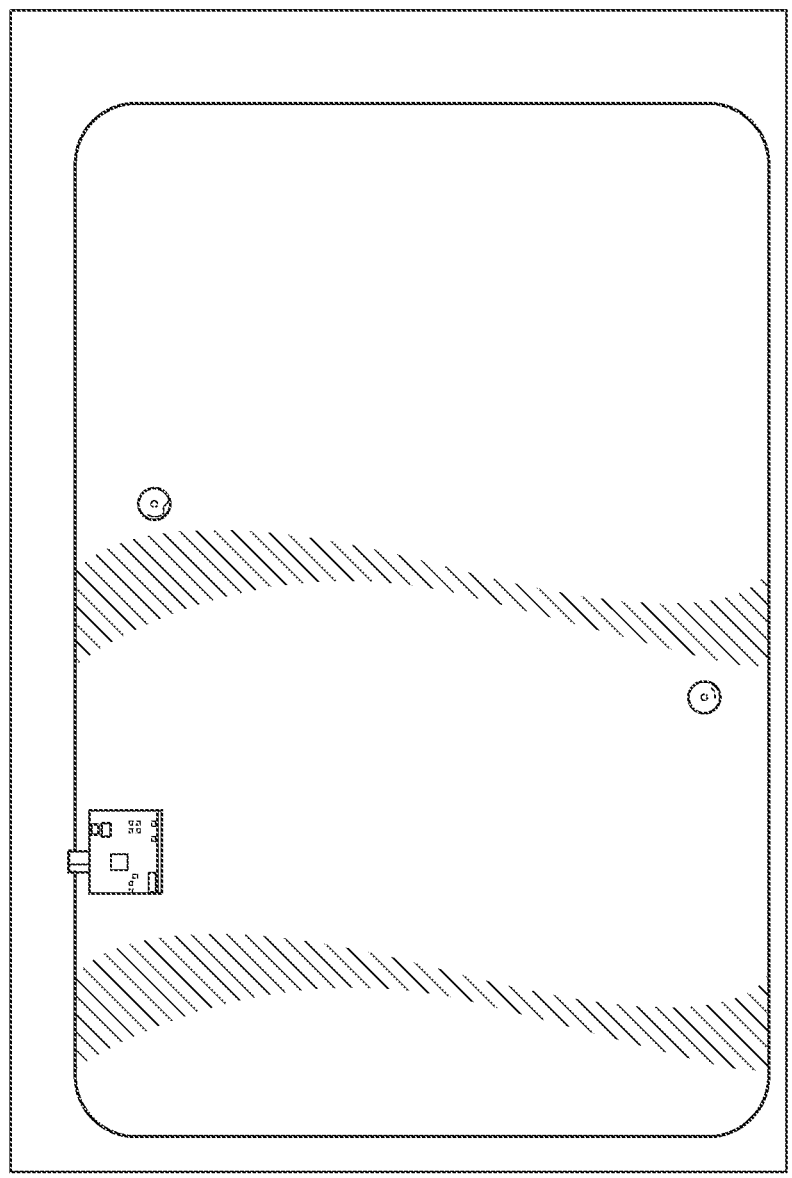

ANTENNA APPARATUS WITH AN INTEGRATED PROXIMITY SENSOR AND METHODS

PRIORITY

This application is a continuation-in-part of co-owned and co-pending U.S. patent application Ser. No. 14/566,584 filed Dec. 10, 2014 of the same title, which claims the benefit of priority to U.S. Provisional Patent Application Ser. No. 62/042,020 filed Aug. 26, 2014 of the same title, each of the foregoing incorporated herein by reference in its entirety.

This application also claims the benefit of priority to Korean Patent Application Serial No. 10-2015-0118236 filed Aug. 21, 2015 of the same title, the contents of which are incorporated herein by reference in its entirety.

TECHNOLOGICAL FIELD

The present disclosure relates generally to antenna solutions for portable wireless devices and particularly in one exemplary aspect to antenna solutions that incorporate an integrated proximity sensor.

DESCRIPTION OF RELATED TECHNOLOGY

Mobile devices with wireless communications capabilities such as mobile computers, mobile phones, smart phones, tablet computers, personal digital assistants (PDAs), "smart" watches, and other personal communication devices (PCDs) have become more ubiquitous and have practically become a necessity for modern life. As a greater variety of devices have entered the mobile computing space, devices have become lighter in weight and smaller in size while the functionality of these devices has increased greatly.

Specific Absorption Rate (SAR) is a measure of the rate at which electromagnetic energy is absorbed by the human body when exposed to, for example, a radio frequency (RF) electromagnetic field. Regulations (by e.g., the Federal Communications Commission (FCC)) exist to limit the SAR exposure users of mobile devices experience and thus limit the output power levels of such mobile devices. For example, the FCC limits RF exposure from cellular phones at a SAR level of 1.6 watts per kilogram (1.6 W/kg) taken over the volume containing a mass of 1 gram of tissue that absorbs the most signal. The European Union via the European Committee for Electrotechnical Standardization (CENELEC) limits RF exposure from mobile phones to 2 W/kg averaged over the 10 g of tissue absorbing the most signal. In mobile devices, to limit exposure to RF and to effectuate the regulations, proximity sensors are utilized to lower the power output of mobile devices in the presence of the human body.

Accordingly, there is a need for apparatus, systems and methods that provide for a smaller size antenna solution that also allow for compliance with SAR regulations. Ideally, such a solution would decrease the size requirements for the antenna/proximity sensor components located on a mobile communications device by, for example, sharing components between a Wireless Wide Area Network (WWAN) antenna solution and a proximity sensor, while also providing decreased noise levels for the devices over prior art solutions by connecting the proximity sensor in parallel with an RF signal path.

SUMMARY

The aforementioned needs are satisfied herein by providing an antenna solution (such as e.g., a WWAN antenna) with an integrated sensor and methods of using and calibrating the same.

In a first aspect of the disclosure, an antenna apparatus is disclosed. In one embodiment, the antenna apparatus includes an antenna feed element; a parasitic element capacitively coupled to the antenna feed element, the parasitic element configured to broaden an impedance bandwidth of the antenna feed element; a capacitor electrically coupled to a ground, the capacitor electrically coupled to the parasitic element; and a proximity sensor electrically coupled to an ESD/decoupling circuit such that the proximity sensor is coupled in parallel to the parasitic element, the proximity sensor configured to detect a change in capacitance in the parasitic element in a presence of a human body and lower an output power of the antenna feed element in response thereto and raise the output power of the antenna feed element in an absence of the human body.

In one variant, the antenna apparatus further includes a processing engine, wherein proximity sensor lowers or raises the output power of the antenna feed element via a signal sent to the processing engine.

In another variant, the antenna apparatus further includes a matching circuit configured to provide frequency tuning of the antenna feed element.

In yet another variant, the ESD/decoupling circuit is electrically coupled in parallel to the parasitic element, the ESD/decoupling circuit configured to block a radio frequency (RF) signal from going into the proximity sensor so as to enable detection of a capacitance change.

In yet another variant, the ESD/decoupling circuit includes two resistors coupled in parallel with the capacitor electrically coupled to the ground.

In yet another variant, the capacitor electrically coupled to the ground is configured to provide a radio frequency (RF) ground for the antenna feed element and block a direct current (DC) path via a high impedance.

In yet another variant, the parasitic element includes a radio frequency (RF) metallization.

In yet another variant, the parasitic element includes a grounded metallization with a $\lambda/4$ element, a floating metallization with a $\lambda/2$ element, or a dual-band parasitic element.

In yet another variant, the antenna feed element includes a dual-band antenna feeding component.

In a second aspect of the disclosure, an antenna apparatus is disclosed. In one embodiment, the antenna apparatus includes an antenna feed characterized by at least one resonating frequency; a grounded antenna component characterized to broaden an impedance bandwidth; a proximity sensing element coupled to the grounded antenna component, the proximity sensing element configured to detect a change in capacitance in the grounded antenna component; and a capacitor providing a radio frequency (RF) ground for the grounded antenna component but not at specific absorption rate (SAR) frequencies.

In one variant, the antenna apparatus further includes an RF controller, wherein the proximity sensing element decreases or increases an output power of the antenna feed via a signal sent to the RF controller.

In another variant, the antenna apparatus further includes a matching circuitry element configured to provide frequency tuning of the antenna feed.

In yet another variant, the antenna apparatus further includes an ESD/decoupling circuit electrically coupled in parallel to the grounded antenna component, the ESD/decoupling circuit configured to block an RF signal from going into the proximity sensing element so as to enable detection of a capacitance change.

In yet another variant, the grounded antenna component includes an RF metallization.

In yet another variant, the antenna feed includes a dual-band antenna feeding component, and the grounded antenna component includes a dual-band parasitic element.

In a third aspect of the disclosure, a method of operating an antenna with an integrated proximity sensor is disclosed. In one embodiment, the method includes detecting a change in capacitance at the proximity sensor coupled in parallel to a grounded antenna component; based, at least in part, on the detecting the change in capacitance, sending, at the proximity sensor, a message indicating a presence of a human body; and lowering a transmit power of the antenna based, at least in part, on a receipt of the message.

In one variant, the method further includes detecting a second change in capacitance at the proximity sensor; and based, at least in part, on the detecting the second change in capacitance, sending, at the proximity sensor, a second message indicating an absence of the human body.

In another variant, the method further includes lowering the transmit power of the antenna based, at least in part, on a receipt of the second message.

In a fourth aspect, a mobile apparatus is disclosed. In one embodiment, the mobile apparatus includes a radio frequency engine; a proximity sensor coupled to the radio frequency engine; one or more antenna feed elements coupled to the radio frequency engine; an antenna grounded element; and a sensor element coupled with the proximity sensor. The one or more antenna feed elements and the antenna grounded element are disposed on a first surface of a substrate and the sensor element is disposed on a second surface of the substrate, the second surface opposing the first surface.

In one variant, a contour for the sensor element generally mirrors a contour for the antenna grounded element.

In another variant, the substrate includes a flexible printed circuit board.

In yet another variant, the proximity sensor is configured to detect a change in capacitance and the antenna grounded element is capacitively coupled with the sensor element.

In yet another variant, the one or more antenna feed elements includes a low band antenna feed element and a high band antenna feed element. A matching circuit is configured to be disposed between the low band antenna feed element and the high band antenna feed element.

BRIEF DESCRIPTION OF THE DRAWINGS

The features, objectives, and advantages of the disclosure will become more apparent from the detailed description set forth below when taken in conjunction with the drawings, wherein:

FIG. 3A is an example of an antenna arrangement with two supply points according to the principles of the present disclosure on a dielectric polyhedron.

FIG. 3B is an example of an antenna arrangement with one supply point according to the principles of the present disclosure on a dielectric polyhedron.

FIGS. 5A-5H show various photographs of a prototype for a WWAN antenna apparatus with an integrated proximity sensor.

Figure 1:
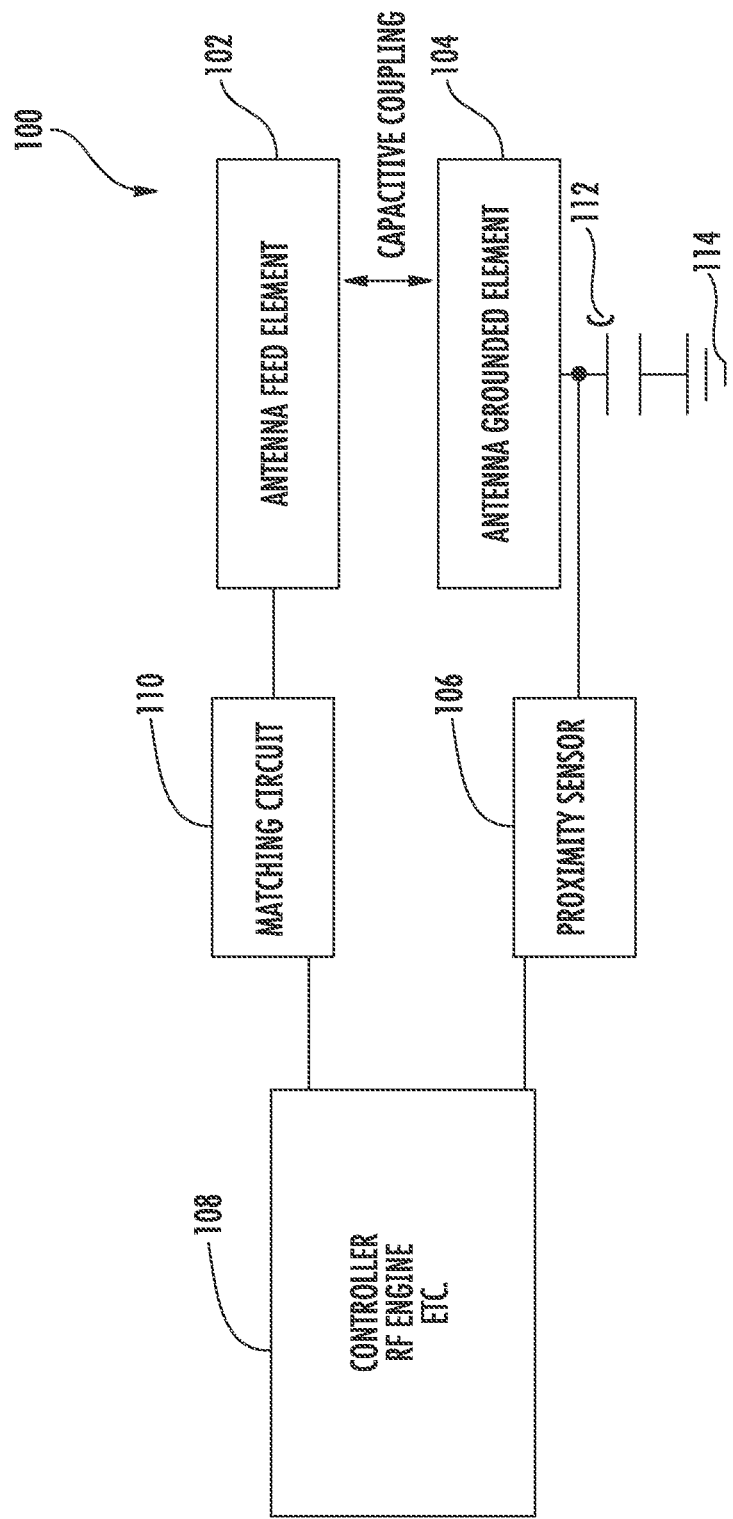
FIG. 1 is a block diagram of a first exemplary embodiment of a Wireless Wide Area Network (WWAN) antenna apparatus with an integrated proximity sensor in accordance with the principles of the present disclosure.

All Figures disclosed herein are © Copyright 2014-2015 Pulse Finland Oy. All rights reserved.

DETAILED DESCRIPTION

Reference is now made to the drawings wherein like numerals refer to like parts throughout.

As used herein, the terms "antenna", and "antenna assembly" refer without limitation to any system that incorporates a single element, multiple elements, or one or more arrays of elements that receive/transmit and/or propagate one or more frequency bands of electromagnetic radiation. The radiation may be of numerous types, e.g., microwave, millimeter wave, radio frequency, digital modulated, analog, analog/digital encoded, digitally encoded millimeter wave energy, or the like. The energy may be transmitted from one location to another location, using, one or more repeater links, and one or more locations may be mobile, stationary, or fixed to a location on earth such as a base station.

As used herein, the terms "board" and "substrate" refer generally and without limitation to any substantially planar or curved surface or component upon which other components can be disposed. For example, a substrate may comprise a single or multi-layered printed circuit board (e.g., FR4), a semi-conductive die or wafer, or even a surface of a housing or other device component, and may be substantially rigid or alternatively at least somewhat flexible.

Furthermore, as used herein, the terms "radiator," "radiating plane," and "radiating element" refer without limitation to an element that can function as part of a system that receives and/or transmits radio-frequency electromagnetic radiation; e.g., an antenna. Hence, an exemplary radiator may receive electromagnetic radiation; transmit electromagnetic radiation; or both.

The terms "feed", and "RF feed" refer without limitation to any energy conductor and coupling element(s) that can transfer energy, transform impedance, enhance performance characteristics, and conform impedance properties between an incoming/outgoing RF energy signals to that of one or more connective elements, such as for example a radiator.

As used herein, the terms "top", "bottom", "side", "up", "down", "left", "right", and the like merely connote a relative position or geometry of one component to another, and in no way connote an absolute frame of reference or any required orientation. For example, a "top" portion of a component may actually reside below a "bottom" portion when the component is mounted to another device (e.g., to the underside of a PCB).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, Long Term Evolution (LTE) or LTE-Advanced (LTE-A), analog cellular, Zigbee, Near field communication (NFC)/RFID, CDPD, satellite systems such as GPS and GLONASS, and millimeter wave or microwave systems.

Overview

The present disclosure provides, inter alia, improved WWAN antenna apparatus with integrated proximity sensor and methods for utilizing and testing the same.

When the human body is exposed to an RF electromagnetic field, the tissue absorbs some of this power, i.e., a specific absorption rate (SAR). Proximity sensors allow a device, such as a mobile communications device, to control the SAR exposure by lowering the transmit power when in proximity to human tissue and increasing transmit power when not in proximity.

In embodiments of the present disclosure, an antenna subsystem and proximity sensing subsystem can share a grounded antenna component/parasitic element. The parasitic element can be used to: (i) broaden the operating band of the antenna feeding component, and (ii) provide an input (via a capacitance change) to a proximity sensor. In further embodiments, the proximity sensor is coupled in parallel to the RF signal path with respect to ground allowing for a reduction in noise because of increased isolation between the antenna subsystem and the sensing subsystem.

More specifically, embodiments of the WWAN antenna with integrated proximity sensor described herein offer: (1) reduced system noise over systems when the proximity sensor is connected in series to the RF signal path, (2) space savings as an antenna grounded element/parasitic element/passive radiator is shared between the antenna system and the proximity sensor element, and (3) the parasitic element can operate on multiple (i.e., two or more) frequency bands (e.g., 700 and 1800 MHz) which allows for the broadening of operating frequencies for the antenna element.

Methods of using and testing the aforementioned WWAN antenna with integrated proximity sensor are also disclosed.

Exemplary Embodiments

Detailed descriptions of the various embodiments and variants of the apparatus and methods of the present disclosure are now provided. While primarily discussed in the context of a WWAN antenna with an integrated proximity sensor, the various apparatus and methodologies discussed herein are not so limited. In fact, many of the apparatus and methodologies described herein are useful in the manufacture of any number of antenna apparatus that can benefit from the antenna grounded element/parasitic element, proximity sensor, and methods described herein, which may also be useful in different applications, and/or provide different signal conditioning functions.

Moreover, while primarily described in the exemplary context of an apparatus with a single antenna feed element, the various principles of the disclosure can be readily extended and applied to implementations having two or more antenna feed elements. Furthermore, while described primarily in the exemplary context of an apparatus with a WWAN antenna, the various apparatus and methodologies discussed herein are not so limited. Those of ordinary skill will readily understand that the teachings of the present disclosure can be applied to virtually any wireless system or wireless communication protocol(s).

Exemplary Antenna Element with Integrated Proximity Sensor

Referring now to FIG. 1, a first exemplary embodiment of a Wireless Wide Area Network (WWAN) antenna apparatus with an integrated proximity sensor is shown and described in detail. As shown, the integrated apparatus 100 includes an antenna feed element 102, an antenna grounded element 104, a proximity sensor 106, a controller 108, a matching circuit 110, and a capacitor 112 coupled to ground 114. Each of these components may be coupled to one or more substrates such as a printed circuit board (PCB).

Antenna feed element 102 may include a resonating element that is configured to resonate at either: (1) a single; or (2) multiple frequency bands (i.e., multi-band). These bands may comprise one or more individual bands configured to support one or more communications standards including, for example, Global System for Mobile Communications (GSM), Long Term Evolution (LTE), Wideband Code Division Multiple Access (W-CDMA), Code Division Multiple Access (CDMA), and/or other standards. For example, these frequency bands may in an exemplary embodiment include LTE 12 (698-746 MHz), LTE 17 (704 MHz to 746 MHz), LTE 13 (746 MHz to 787 MHz), LTE 14 (758 MHz to 798 MHz), LTE 20 (791 to 862 MHz), GSM850 (824 MHz to 894 MHz), E-GSM-900 (880 MHz to 960), DCS1800 (1710 MHz to 1880 MHz), PCS1900 (1850 MHz to 1990 MHz), WCDMA1 (1920 MHz to 2170 MHz), and LTE 7 (2500 MHz to 2690 MHz). Various other combinations or permutations of the foregoing (and in fact others) will be recognized by those of ordinary skill given the present disclosure.

In one embodiment, antenna feed element 102 can comprise a 7-band LTE antenna described infra, which may include two antenna elements of a monopole-type, which can be connected to a supply point, and one shared parasitic element which together provide two frequency bands to be utilized in the data processing device.

Antenna feed element 102 may be capacitively coupled to the antenna grounded element 104. Alternatively, the antenna feed element 102 may be coupled to the antenna grounded element 104 via one or more resistive/reactive elements. The antenna grounded element 104 can include a passive radiator or parasitic element. The antenna grounded element can be an RF grounded or floating metallization. In grounded embodiments the antenna grounded element 104 can resonate at $\lambda/4$ and in floating embodiments the antenna grounded element 104 can resonate at $\lambda/2$, where $\lambda$ is the wavelength of at least one operating band of the antenna. The antenna grounded element 104 may be used to broaden the impedance bandwidth of the antenna. As such, the parasitic element 104 may be active at a single or multiple bands in order to broaden the RF bands on the corresponding band.

The antenna ground element 104 can also change capacitance in the presence of other objects such as human tissue. Such capacitive change can be detected (by, e.g., a proximity sensor 106) and utilized to detect the presence or absence of, for example, human tissue. As such, the antenna grounded element 104 may be advantageously utilized by both the antenna system as well as the proximity sensing system in the apparatus 100.

The grounded antenna element 104 is, in an exemplary embodiment, coupled to a capacitor 112 to a grounded element 114. This coupling may include other reactive and/or resistive components in a parallel or series coupling so as to achieve desired RF ground characteristics. For example, as shown the capacitor 112 to ground 114 provides an RF ground but blocks (via high impedance) the direct current (DC) path. As a brief aside, a capacitor stores electrical charge. At high frequencies, the capacitor behaves as if it were a short. At low frequencies the capacitor behaves as if it were an open circuit. Thus, the capacitor is selected such that it presents a short to ground above a certain frequency i.e., it behaves as an RF ground.

The proximity sensor 106 is, in the illustrated embodiment, coupled to the grounded antenna element 104 in parallel with respect to ground. This parallel coupling allows for increased isolation between the antenna functionality and the proximity sensing functionality which in turn translates into a reduction of noise for the integrated apparatus 100. The proximity sensor 106 is, in an exemplary embodiment, a proximity sensor from the Azoteq ProxSense® line of proximity sensors (such as the IQS229) which utilizes the charge transfer method of capacitive sensing. However, it is appreciated that other proximity sensing apparatus and sensing methodologies may be utilized consistent with the principles of the present disclosure. Generally speaking, such sensors can detect changes in capacitance and can in turn output a signal to a controller (such as controller 108), which will in turn raise or lower the output power for the transmitter based on this detected change in capacitance.

In some embodiments, the detection of a capacitance change (from grounded antenna element 104) may be calibrated to work with the input system of the proximity sensor 106 such that the proximity sensor can accurately detect the presence of, for example, human tissue. The capacitance change detected by the proximity sensor 106 may have to be greater than a threshold value to send a signal to the controller 108 to raise or lower the transmit power. Alternatively, the absolute capacitance detected by the proximity sensor 106 may be utilized to determine whether to send a signal to the controller 108 to raise or lower the transmit power. In still other embodiments, the change in capacitance must exceed a minimum amount of time (i.e., transitory changes are insufficient to trigger a change).

In alternative embodiments, the proximity sensor 106 is coupled to the grounded antenna element 104 in series. While such configurations may provide less isolation between the sensing circuitry and the antenna path, other design considerations may take precedence (e.g., layout format, power consumption, etc.).

The controller 108 is, in the illustrated embodiment, an RF engine that controls the transmit power of the apparatus 100. As discussed previously herein, signals originating from the proximity sensor 106 are interpreted by the controller 108, which in turn is responsible for dictating the transmit power of the apparatus 100. Accordingly, when, for example, a body is brought in close proximity to the integrated apparatus, the sensed capacitance change is detected by the proximity sensor 106 which in turn transmits/sends a signal to the controller 108. The controller subsequently increases or decreases the output power fed to the antenna feed element 102.

Impedance matching in apparatus 100 is accomplished via a matching circuit 110 coupled to the controller 108 (e.g., RF engine). Additionally, frequency tuning for the antenna feed element 102 may be effectuated via impedance matching circuit 110.

Figure 1A:
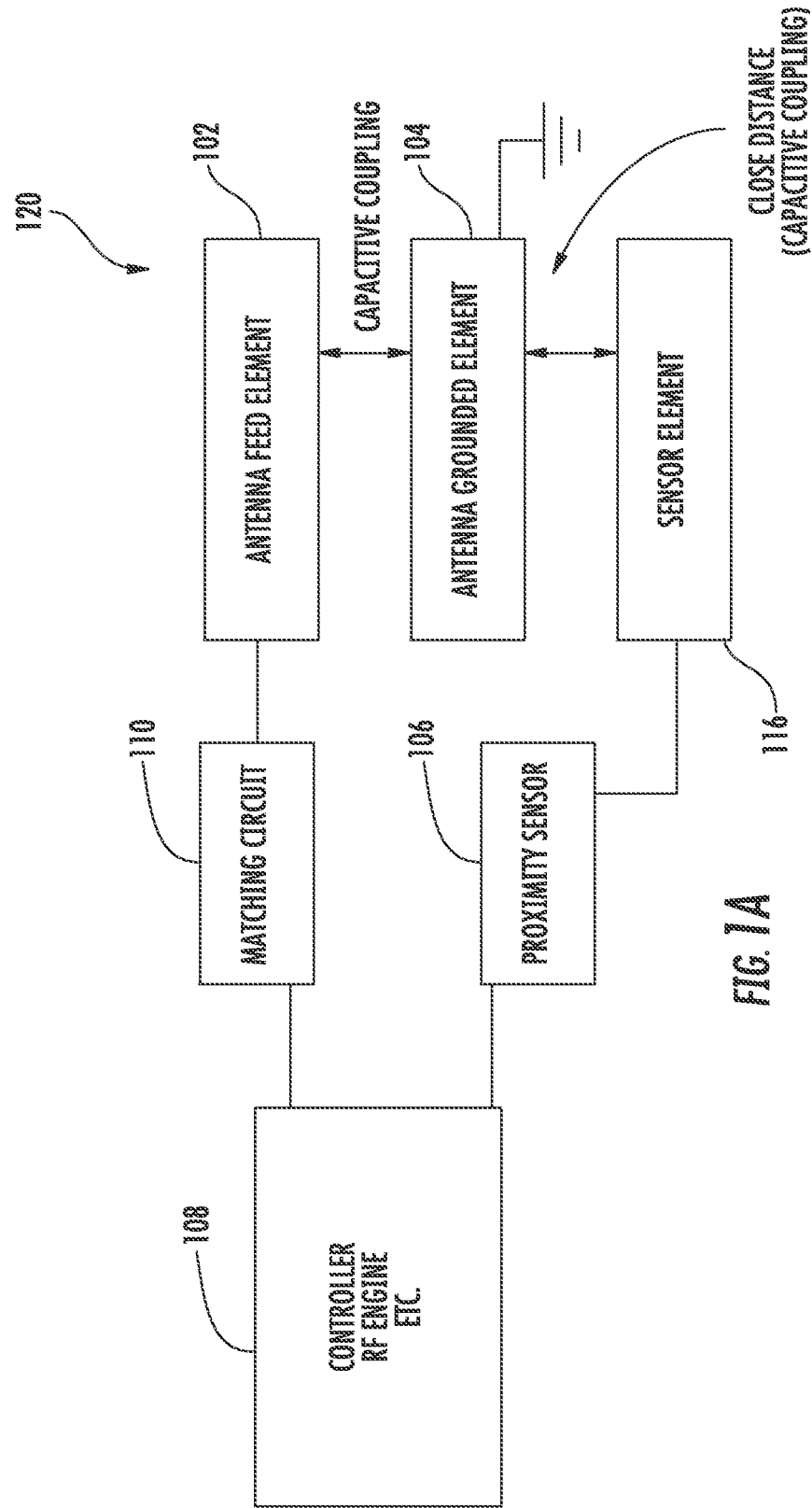
FIG. 1A is a block diagram of a second exemplary embodiment of a WWAN antenna apparatus with an integrated proximity sensor and separate sensor element in accordance with the principles of the present disclosure.

Referring now to FIG. 1A, a variant for the first exemplary embodiment of a Wireless Wide Area Network (WWAN) antenna apparatus with an integrated proximity sensor is shown and described in detail. As shown, the integrated apparatus 120 (and similar to the embodiment discussed above with regards to FIG. 1) includes an antenna feed element 102, an antenna grounded element 104 coupled to ground, a proximity sensor 106, a controller 108, and a matching circuit 110. Each of these components may be coupled to one or more substrates such as a printed circuit board (PCB).

Antenna feed element 102 may include a resonating element that is configured to resonate at either: (1) a single; or (2) multiple frequency bands (i.e., multi-band). These bands may comprise one or more individual bands configured to support one or more communications standards including, for example, Global System for Mobile Communications (GSM), Long Term Evolution (LTE), Wideband Code Division Multiple Access (W-CDMA), Code Division Multiple Access (CDMA), and/or other standards. For example, these frequency bands may in an exemplary embodiment include LTE 12 (698-746 MHz), LTE 17 (704 MHz to 746 MHz), LTE 13 (746 MHz to 787 MHz), LTE 14 (758 MHz to 798 MHz), LTE 20 (791 to 862 MHz), GSM850 (824 MHz to 894 MHz), E-GSM-900 (880 MHz to 960), DCS1800 (1710 MHz to 1880 MHz), PCS1900 (1850 MHz to 1990 MHz), WCDMA1 (1920 MHz to 2170 MHz), and LTE 7 (2500 MHz to 2690 MHz). Various other combinations or permutations of the foregoing (and in fact others) will be recognized by those of ordinary skill given the present disclosure.

Figure 3C:
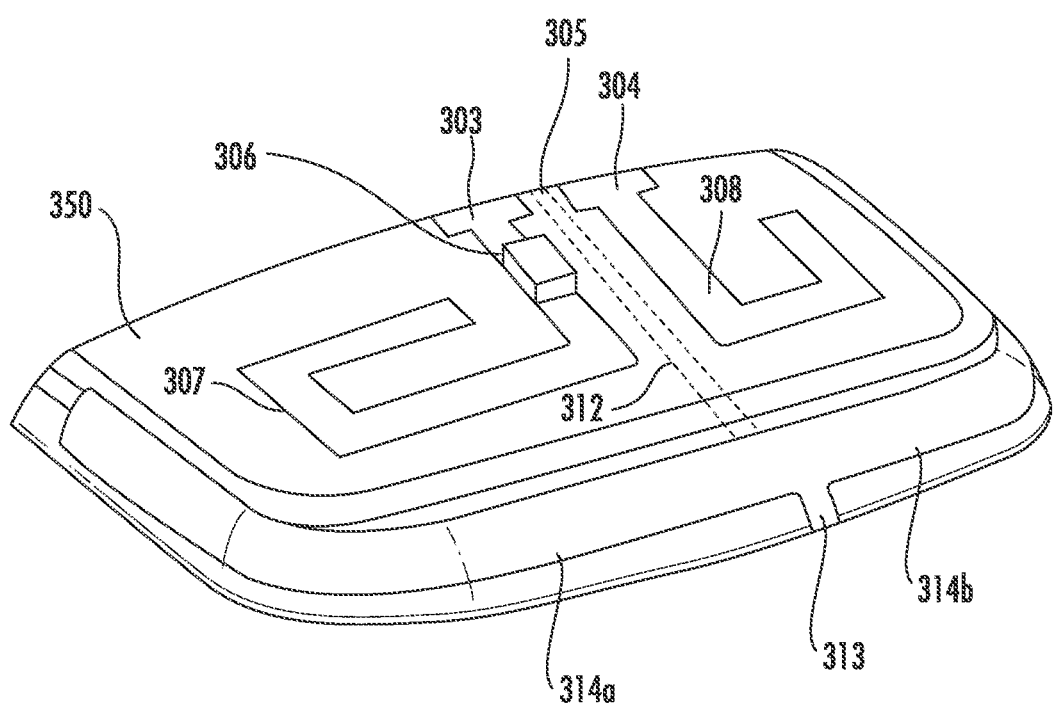
FIG. 3C is an example of an antenna arrangement with two supply points according to the principles of the present disclosure on an irregular dielectric piece.

In one embodiment, antenna feed element 102 can comprise a 7-band LTE antenna described infra, which may include two antenna elements of a monopole-type, which can be connected to one or more supply points as described with regards to FIGS. 3A-3C, and one shared parasitic element which together provide two frequency bands to be utilized in the data processing device.

Antenna feed element 102 may be capacitively coupled to the antenna grounded element 104. Alternatively, the antenna feed element 102 may be coupled to the antenna grounded element 104 via one or more resistive/reactive elements. The antenna grounded element 104 can include a passive radiator or parasitic element. The antenna grounded element can be an RF grounded or floating metallization. In grounded embodiments the antenna grounded element 104 can resonate at $\lambda/4$ and in floating embodiments the antenna grounded element 104 can resonate at $\lambda/2$, where $\lambda$ is the wavelength of at least one operating band of the antenna. The antenna grounded element 104 may be used to broaden the impedance bandwidth of the antenna. As such, the parasitic element 104 may be active at a single or multiple bands in order to broaden the RF bands on the corresponding band.

The proximity sensor 106 is, in the illustrated embodiment, coupled to sensor element 116. The sensor element 116 is capacitively coupled to the antenna grounded element 104 by being placed in close proximity thereto, without galvanic contact occurring between the sensor element 116 and the antenna grounded element. The proximity sensor 106 is, in an exemplary embodiment, a proximity sensor from the Azoteq ProxSense® line of proximity sensors (such as the IQS229) which utilizes the charge transfer method of capacitive sensing. However, it is appreciated that other proximity sensing apparatus and sensing methodologies may be utilized consistent with the principles of the present disclosure. Generally speaking, such sensors can detect changes in capacitance and can in turn output a signal to a controller (such as controller 108), which will in turn raise or lower the output power for the transmitter based on this detected change in capacitance.

In some embodiments, the detection of a capacitance change (from sensor element 116) may be calibrated to work with the input system of the proximity sensor 106 such that the proximity sensor can accurately detect the presence of, for example, human tissue. The capacitance change detected by the proximity sensor 106 may have to be greater than a threshold value to send a signal to the controller 108 to raise or lower the transmit power. Alternatively, the absolute capacitance detected by the proximity sensor 106 may be utilized to determine whether to send a signal to the controller 108 to raise or lower the transmit power. In still other embodiments, the change in capacitance must exceed a minimum amount of time (i.e., transitory changes are insufficient to trigger a change).

The controller 108 is, in the illustrated embodiment, an RF engine that controls the transmit power of the apparatus 100. As discussed previously herein, signals originating from the proximity sensor 106 are interpreted by the controller 108, which in turn is responsible for dictating the transmit power of the apparatus 120. Accordingly, when, for example, a body is brought in close proximity to the integrated apparatus, the sensed capacitance change is detected by the proximity sensor 106 which in turn transmits/sends a signal to the controller 108. The controller subsequently increases or decreases the output power fed to the antenna feed element 102.

Impedance matching in apparatus 100 is accomplished via a matching circuit 110 coupled to the controller 108 (e.g., RF engine). Additionally, frequency tuning for the antenna feed element 102 may be effectuated via impedance matching circuit 110.

Figure 1B:
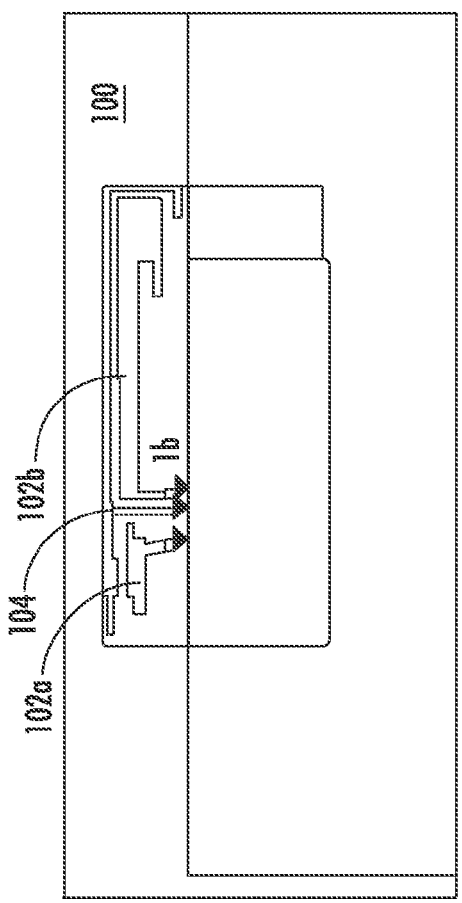
FIG. 1B is a front plan view of an exemplary implementation for the WWAN antenna apparatus with an integrated proximity sensor of FIG. 1 in accordance with the principles of the present disclosure.

Referring now to FIG. 1B, one exemplary implementation for the first WWAN antenna apparatus 100 with an integrated proximity sensor as shown with regards to FIG. 1 above is shown and described in detail. Specifically, the proximity sensor (not shown) is integrated parallel with the antenna grounded element 104. In the exemplary implementation shown in FIG. 1B, the WWAN antenna apparatus 100 includes two antenna feed elements 102 including a high band antenna feed element 102a and a low band antenna feed element 102b. The matching circuit (not shown) is positioned between antenna feed elements 102a, 102b and coupled to the RF engine (not shown).

Figure 1D:
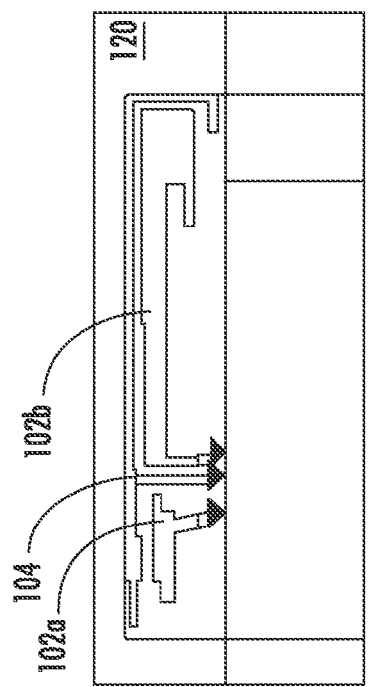
FIG. 1D is a front plan view of an exemplary implementation for the WWAN antenna apparatus with an integrated proximity sensor of FIG. 1A in accordance with the principles of the present disclosure.
Figure 1C:
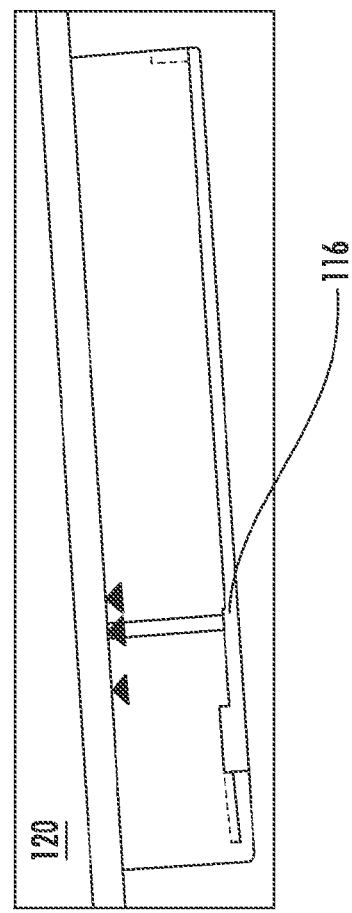
FIG. 1C is a back plan view of an exemplary implementation for the WWAN antenna apparatus with an integrated proximity sensor of FIG. 1A in accordance with the principles of the present disclosure.

Referring now to FIGS. 1C and 1D, one exemplary implementation for the WWAN antenna apparatus 120 with an integrated proximity sensor (not shown) as shown with regards to FIG. 1A above is shown and described in detail. Specifically, FIG. 1C illustrates the sensor element 116 disposed on a first side of, for example, a flex circuit board. In the illustrated embodiment, the contour of sensor element 116 generally follows along with the contour of antenna grounded element (104, FIG. 1D). However, it is appreciated that in alternative embodiments, the contour of sensor element 116 may differ slightly from the contour of antenna grounded element 104. In the exemplary implementation shown in FIG. 1D, the WWAN antenna apparatus 120 includes two antenna feed elements including a high band antenna feed element 102a and a low band antenna feed element 102b. The matching circuit (not shown) is positioned between antenna feed elements 102a, 102b and coupled to the RF engine (not shown).

Figure 2:
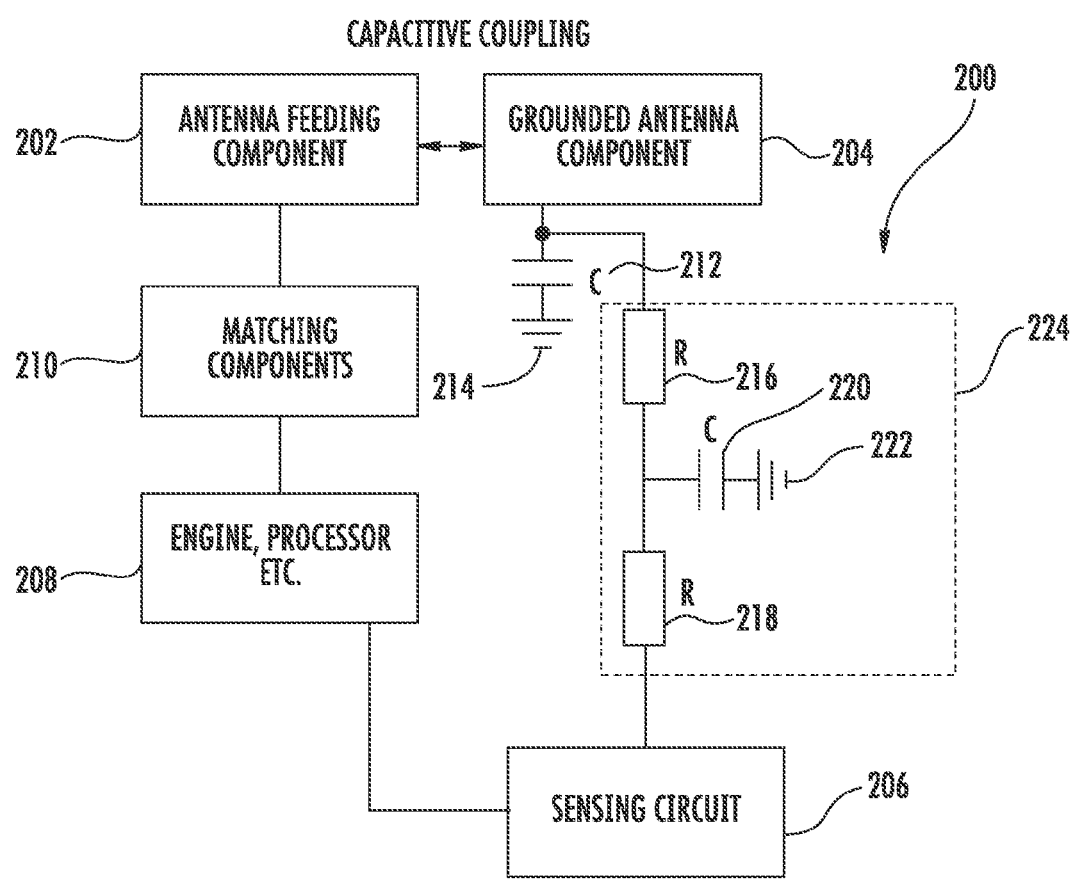
FIG. 2 is a block diagram of a third exemplary embodiment of a WWAN apparatus with an integrated proximity sensor in accordance with the principles of the present disclosure.

Referring now to FIG. 2, a second exemplary embodiment of a Wireless Wide Area Network (WWAN) antenna apparatus with an integrated proximity sensor is shown and described in detail. The embodiment illustrated in FIG. 2 is architecturally similar to the embodiment illustrated and discussed above with respect to FIG. 1, in that the antenna apparatus with integrated proximity sensor 200 includes an antenna feeding component 202, a grounded antenna component 204, a proximity sensing circuit 206, a controller 208, matching circuitry 210, and a capacitor 212 coupled to ground 214. Similar to the embodiment discussed above with reference to FIG. 1, the grounded antenna component 204 is coupled to the antenna feeding component 202 via capacitive coupling.

However, unlike the embodiment described above with reference to FIG. 1, an ESD/decoupling circuit 224 comprising resistors 216, 218 and a capacitor 220 coupled to ground 222 is also disposed between the grounded antenna component 204 and the proximity sensing circuit 206. Similar to its operation in FIG. 1, the grounded antenna component 204 changes capacitance in the presence of, for example, human tissue. However, the ESD/decoupling circuit 224 is configured to prevent an RF signal from going into the sensing circuit 206 so that a capacitance change can be detected. The ESD/decoupling circuit 224 may comprise any assortment of reactive/resistive components, which in combination with the grounded antenna component 204, results in a detectable change in capacitance for the proximity sensor at a desired distance.

The proximity sensing circuit 206 is further coupled to the ESD/decoupling circuit 224 and receives as input detected changes in capacitance of the grounded antenna component 204, as modified by the ESD/decoupling circuit 224. The sensing circuit 206 can then output a signal to inform the controller 208 regarding, for example, a change in proximity of a user. Similar to that discussed previously with regards to FIG. 1 discussed above, the controller 208 can subsequently be configured to alter the output power of the antenna feeding component 202 transmissions in order to, for example, comply with SAR regulations. The RF signal path for receiving incoming RF signals in the antenna apparatus 200 is fed to the controller 208 via the antenna feeding component 202 and matching circuit 210. The RF signal path of the antenna subsystem (e.g., antenna feeding component 202) is isolated from the signal path of the sensing subsystem as the grounded antenna component 204 is coupled to the sensing circuit 206 via a parallel circuit.

Antenna Feed Element

Referring now to FIGS. 3a and 3b, an antenna arrangement 300, 330 for use with the integrated proximity sensor according to FIGS. 1 and 2 is shown and described in detail. Moreover, in the embodiment illustrated in FIG. 3c, yet another antenna arrangement 350 for use with the integrated proximity sensor according to FIGS. 1 and 2 is shown and described in detail.

FIG. 3a shows an example of an antenna arrangement 300 according to the principles of the present disclosure, where two monopole-type radiating elements 307 and 308 each have their own supply point/antenna port 303, 304, respectively, on the upper surface (radiating plane) of the antenna module (polyhedron). These monopole-type radiating elements 307 and 308 in combination with their own supply point/antenna port 303, 304 make up the antenna feed element 102 and the antenna feeding component 202 shown in FIGS. 1 and 2, respectively. The antenna arrangement 300 in FIG. 3a can advantageously be used as the antenna of a data processing device, which utilizes two separate frequency bands. The used frequency bands may be, for example, 824-960 MHz and 1710-2170 MHz.

The data processing device includes a planar circuit board (PCB) 310. The main part of the conductive upper surface 311 of the circuit board 310 can function as the ground plane (GND) of the data processing device. The circuit board 310 advantageously has a rectangular shape, which has a first end 310a and a second end 310b, which are parallel with one another. The ground plane 311 extends from the second end 310b of the circuit board 310 to the grounding point 305 of the parasitic element 314 of the antenna module comprised in the antenna arrangement 300 according to the principles of the present disclosure. In the antenna arrangement 300, the antenna module 320 to be used is installed in the first end 310a of the circuit board 310. The ground plane 311 has been removed from the first end 310a of the circuit board 310 at the part left underneath the antenna module 320.

The antenna module 320 of the antenna arrangement 300 is advantageously implemented on a dielectric polyhedron, all the faces of which are advantageously rectangles. Thus the opposite faces of the polyhedron are of the same shape and size. The outer dimensions of the polyhedron are advantageously the following. The long sides 302a and 302d of the polyhedron are projected onto the level of the circuit board 310, which in FIG. 3a are in the direction of the first end 310a of the circuit board; advantageously have a length of about 50 mm. The short sides 302b and 302c of the polyhedron projected onto the level of the circuit board 310 are in the direction of the sides in the direction of the longitudinal axis of the circuit board 310. The short sides 302b and 302c of the polyhedron advantageously have a length of about 15 mm. The thickness of the polyhedron is advantageously about 5 mm.

The antenna module 320 is advantageously installed in the first end 310a of the circuit board 310. The ground plane 311 of the circuit board 310 is removed from the surface area of the first end 310a of the circuit board 310, which is left underneath the antenna module 320 when installed into place. Electronic components of the data processing device (not shown in FIG. 3a) are installed in the second end 310b of the circuit board 310.

In the example in FIG. 3a, the exemplary parasitic element 314 is implemented on three sides/surfaces 302a, 302b and 302c of the antenna module 320, which are perpendicular to the level defined by the circuit board 310. The parasitic element 314 is thus advantageously implemented on three surfaces of the antenna module 320. The parasitic element 314 advantageously has the shape of a flat-bottomed/sharp-angled U. The parasitic element 314 is divided into two branches 314a and 314b. The branch 314a functions as the parasitic element of the lower frequency range radiator 307. The branch 314b functions as the parasitic element of the upper frequency range radiator 308. In one exemplary embodiment, the parasitic element 314 acts as the antenna grounded element 104 shown in FIG. 1 or alternatively as the grounded antenna component 204 shown in FIG. 2.

The branches 314a and 314b of the parasitic element 314 are connected together at the connection point 313 on the side 302a of the antenna module 320. The connection point 303 of the branches 314a and 314b of the parasitic element 314 is in the example of FIG. 3a closer to the shorter side 302c of the antenna module than to the side 302b. In the example of FIG. 3a, the branches 314a and 314b of the parasitic element 314 are conductive strips.

When the antenna module 320 is installed into place the branches 314a and 314b of the parasitic element 314 are close to the outer edges of the first end 310a of the circuit board 310. Thus the bottom of the U of the parasitic element 314 is substantially in the direction of the side (edge) 302a of the antenna module 320 and the end 310a of the circuit board 310. The first arm 314c of the U of the parasitic element 314 is in the direction of the side 302b of the antenna module 320. The second arm 314d of the U of the parasitic element 314 is in the direction of the side 302c of the antenna module 320. Thus the arms 314b and 314c of the parasitic element 314 are directed toward the side 302d of the antenna module 320 and simultaneously toward the ground plane 311 of the circuit board 310. The arms 314c and 314d do however not extend so far that they would generate an electric contact to the ground plane 311 of the circuit board 310.

The conductive strip 312 of the parasitic element 314, which short-circuits to the ground plane 311 of the circuit board 310, is connected to the ground plane 311 of the circuit board 310 at the grounding/connecting point 305. A conductive strip 312 in the direction of the longitudinal axis of the circuit board departs from the grounding point 305 toward the side 302a of the antenna module 320, which conductive strip 312 is joined with the U-shaped parasitic element 314 at the connecting point 313 of its branched 314a and 314b. The grounding point 305 of the conductive strip 312 and the ground plane 311 is situated at the ground plane 311 of the circuit board 310 close to the points, where the supply points 303 and 304 of the antenna element situated on the upper surface of the antenna module 320 can be projected onto the level of the circuit board. The distance between the connecting point 305 and the projections of the supply points 303 and/or 304 in the level defined by the circuit board 310 is advantageously in the range of 1-4 mm. This projected distance/distances and the length and width of the conductive strip 312 of the parasitic element 314 short-circuiting to the ground plane 311 are used to determine the resonance frequency of the lower frequency band provided with the parasitic element 314. The resonance location caused by the parasitic element on the lower frequency band is a so-called quarter-wave resonance. This resonance location is hereafter called the first resonance of the lower frequency band.

The parasitic resonance location of the upper frequency band is determined by the total length of the parasitic element 314. The resonance frequency on the upper frequency band is a so-called half-wave resonance location. This resonance location is hereafter called the first resonance of the upper frequency band.

The monopole-type radiators 307 and 308 of the antenna arrangement 300 are on the planar upper surface (radiating surface) of the antenna module 320. The monopole-type radiators 307 and 308 are formed from conductive strips, the lengths of which are in the range of a quarter-wave in either of the frequency ranges used by the data processing device. The width of the conductive strips forming the radiators 307 and 308 is advantageously in the range of 0.5-3 mm.

The lower frequency range radiator 307 is supplied from the antenna port/supply point 303. The supply point 303 and the radiating element 307 are connected by a coil 306, the inductance of which is approximately 13 nH. The coil 306 is used to shorten the physical length of the lower frequency range radiator 307, whereby the surface area required by the radiator 307 is reduced. The lower frequency band radiator 307 advantageously comprises four conductive parts 307a, 307b, 307c and 307d, which make up the first conductor branch. The first conductive part 307a is in the direction of the longitudinal axis of the circuit board 310, and its starting point is the coil 306 and its direction is toward the longer side 302a of the antenna module 320. Before the longer side 302a of the antenna module 320 it turns by 90° and is connected to the second conductive part 307b, which is in the direction of the side 302a of the antenna module 320. The direction of the second conductive part is toward the side 302b of the antenna module 320. The second conductive part 307b is connected to the third conductive part 307c before the side 302b of the antenna module 320. At the connecting point a 90° turn occurs in the same direction as in the previous connecting point. The third conductive part 307c is in the direction of the side 302b of the antenna module 320 and it travels from the connecting point toward the side 302d of the antenna module 320. The third conductive part 307c is connected to the fourth conductive part 307d before the side 302d of the antenna module 320. At the connecting point a 90° turn occurs in the same direction as in the previous connecting points. From this connecting point the fourth conductive part 307d continues in the direction of the side 302d of the antenna module 302A toward the first conductive part 307a, however without reaching it. The total length of the radiator 307 and the coil 306 affecting the electric length of the radiator 307 generates a $\lambda/4$ resonance at the lower frequency range. This natural resonance location is hereafter called the upper resonance location of the lower frequency band.

The monopole-type radiator 308 of the upper frequency range is supplied from the supply point 304. The upper frequency band radiator 308 advantageously comprises three conductive parts 308a, 308b and 308c. The first conductive part 308a is in the direction of the longitudinal axis of the circuit board 310, and its starting point is the supply point 304 and its direction is toward the longer side 302a of the antenna module 320. Before the side 302a of the antenna module 320 it is connected to the second conductive part 308b. In the connecting point a 90° turn occurs toward the side 302c of the antenna module 320. Thus the second conductive part 308b is in the direction of the side 302a of the antenna module 320. The second conductive part 308b is connected to the third conductive part 308c before the side 302c of the antenna module 320. At the connecting point a 90° turn occurs in the same direction as in the previous connecting points. The third conductive part 308c is in the direction of the side 302c of the antenna module 320 and it continues from the connecting point toward the side 302d of the antenna module 320, however without reaching it. The total length of the radiator 308 generates a $\lambda/4$ resonance on the upper frequency range used by the data processing device. This natural resonance location is hereafter called the upper resonance location of the upper frequency band.

The tuning of the antenna arrangement 300 according to FIG. 3a to two frequency bands is implemented as follows. The resonance location provided by the parasitic element 314 on the lower frequency band is defined by the mechanical dimensions of the conductive strip 312 and by the projected distances of the connecting point 305 and the supply points 303 and 304 of the antenna radiators 307 and 308 on the level of the circuit board 310. In the antenna arrangement 300, the location of the connecting point 305 in relation to the location of the supply points 303 and/or 304 on the level defined by the circuit board 310 and the length and width (i.e. inductance) of the conductive strip 312 of the parasitic element 314 short-circuiting to the ground plane define the first resonance location generated by the parasitic element 314 on the lower frequency range. The resonance is a so-called quarter-wave resonance location. The location of the first resonance location of the upper frequency range is defined by the total length of the parasitic element 314, and it is a so-called half-wave resonance location.

The second resonance location ($\lambda/4$ resonance) of the antenna arrangement 300 is generated on the lower frequency band at a frequency defined by the length of the monopole-type radiator 307 and the coil 306. The second resonance location ($\lambda/4$ resonance) of the upper frequency band is defined by the length of the monopole-type radiator 308.

FIG. 3b shows an example of an antenna arrangement 330 according to a second embodiment of the invention, where the monopole-type radiating elements 307 and 308 have a shared supply point/antenna port 303a on the upper surface of the antenna module 332.

In this embodiment the circuit board 310, the antenna module 332 installed on the circuit board and the parasitic element 314 otherwise correspond to the corresponding structures in the embodiment of FIG. 3a. Also the location of the lower frequency range radiator 307 and its mechanical dimensions correspond to the embodiment presented in FIG. 3a.

In the embodiment of FIG. 3b there is only one supply point/antenna port 303a. The mechanical elements of the lower frequency range monopole-type radiator 307 are connected to the supply point 303a through the coil 306. The upper frequency range monopole-type radiator 308 is connected to the supply point 303a by means of a connection conductor 318, which is connected to the supply point at the point 317.

The tuning of the antenna arrangement 330 according to FIG. 3b to two frequency bands is implemented as follows. The first resonance location provided by the parasitic element 314 on the lower frequency band is defined by the mechanical dimensions of the conductive strip 312 and by the distance between the connecting point 305 and the point projected by the supply point 303a of the antenna radiators 307 and 308 on the level of the circuit board 310. In the antenna arrangement 330, the location of the connecting point 305 in relation to the projected location of the supply point 303a on the level defined by the circuit board 310 and the length and width (i.e. inductance) of the conductive strip 312 of the parasitic element 314 short-circuiting to the ground plane define the first resonance location generated by the parasitic element 314 on the lower frequency range. The resonance is a so-called quarter-wave resonance location.

The location of the first resonance location of the upper frequency range is defined by the total length of the parasitic element 314, and it is a so-called half-wave resonance location.

In the examples of FIGS. 3a and 3b the parasitic element 314 is so long compared to the width of the radio device that it extends onto three sides 302a, 302b and 302c of the antenna module 320 or 332. Still, if the outer dimensions of the radio device change so that the width of the radio device increases, then the parasitic element 314 can be either on the end side 302a and the side 302c or only on the end side 302a. In all situations, the resonance frequencies of the parasitic element 314 are determined in the above-described manner.

The second resonance location ($\lambda/4$ resonance) of the antenna arrangement 300 is generated on the lower frequency band at a frequency defined by the length of the monopole-type radiator 307 and the coil 306. The second resonance location ($\lambda/4$ resonance) of the upper frequency band is defined by the mechanical dimensions of the monopole-type radiator 308.

The technical advantage of the embodiments shown in FIGS. 3a and 3b is that both the lower and the upper frequency range can be sized with mechanical sizing and positioning of the antenna elements according to the invention. Thus no adaptation connecting implemented with discrete components is needed on the circuit board 310.

It is also a technical advantage of the embodiments of FIGS. 3a and 3b that antenna arrangements utilizing a shared supply point or two antenna-specific supply points are structurally identical except for the supply point. Both supply methods provide desired properties both on the lower and the upper frequency band.

FIG. 3c shows an example of an antenna arrangement which is implemented on the surface of a partly irregular dielectric piece. FIG. 3c does not show the circuit board, onto which the antenna module 350 is installed. The two monopole-type radiating elements 307 and 308 shown in FIG. 3c have their own supply points/antenna ports, references 303 and 304, on the upper surface of the antenna module 302C. The branches 314a and 314b of the parasitic element 314 are implemented on the at least partly curved side surfaces of the dielectric piece. The short-circuit conductor 312 of the parasitic element 314 departs from the short-circuit point 305 and advances in the direction of the longitudinal axis of the circuit board functioning as an installation base on the substantially planar lower surface of the antenna module 350 toward the first end of the circuit board. At the outer edge of the antenna module 350 the short-circuit conductor 305 turns to the end surface of the antenna module 350, where it is connected to the parasitic element at the connection point 313 of the branches of the parasitic element.

An antenna module with one supply point according to FIG. 3b can also be implemented in the same manner.

Method of Use

Figure 4:
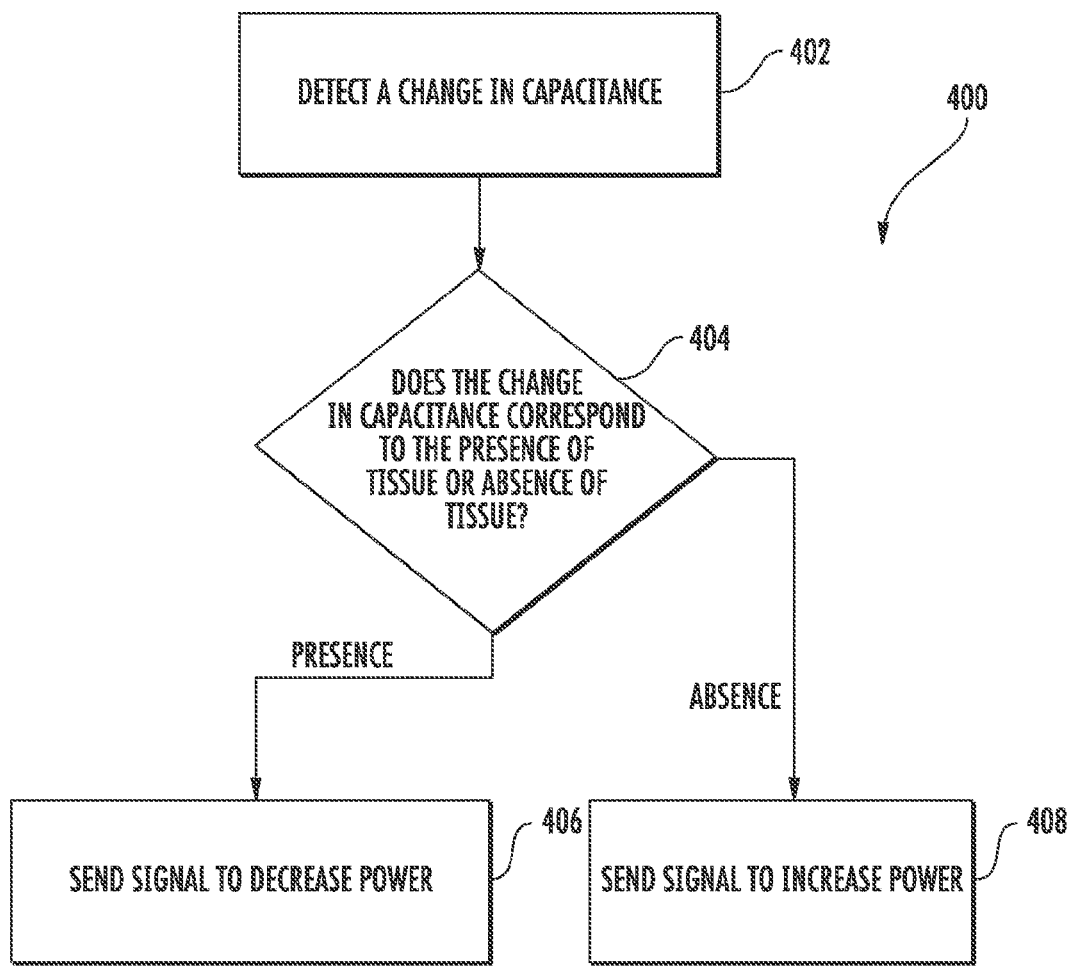
FIG. 4 is a logical flow diagram illustrating operation of the exemplary WWAN antenna apparatus with an integrated proximity sensor.

FIG. 4 illustrates a method of operating the exemplary embodiment of the WWAN antenna apparatus with integrated proximity sensor (e.g., FIGS. 1 and 2) of the disclosure. The operations of method 400 presented below are intended to be illustrative. In some implementations, method 400 may be accomplished via one or more additional operations. Methodology 400 may be implemented in one or more processing devices (e.g., a digital processor, an analog processor, a digital circuit designed to process information, an analog circuit designed to process information, a state machine, and/or other mechanisms for electronically processing information and/or execute computer program modules. The one or more processing devices may include one or more devices executing some or all of the operations of methods 400 in response to instructions stored electronically on an electronic storage medium. The one or more processing devices may include one or more devices configured through hardware, firmware, and/or software to be specifically designed for execution of one or more of the operations of method 400.

At step 402, a change in capacitance for the mobile device is detected. In one embodiment, the detected change in capacitance of a parasitic element (i.e., grounded antenna component 104, 204) is resultant from a signal input received by a proximity sensing circuit. In variants of the present disclosure, this signal input may have been conditioned (for example, via calibration circuit 224, FIG. 2) prior to being received by the proximity sensing circuit.

At step 404, a determination is made as to whether the detected change in capacitance of the parasitic element corresponds to the presence of, for example, human tissue.

When it is determined that a change in capacitance corresponds to the presence of, for example, human tissue, at step 406, a signal is sent from the proximity sensing circuit to a controller resulting in a decrease in transmit power for the antenna.

Alternatively, when it is determined that a change in capacitance corresponds to the absence of, for example, human tissue at step 408, a signal is sent from the proximity sensing circuit to a controller resulting in an increase in transmit power for the antenna.

Performance

FIGS. 5A through 10 present testing prototypes and performance results obtained during simulation and testing by the Assignee hereof of an exemplary WWAN antenna apparatus with integrated sensor according to one or more embodiments described above with respect to FIGS. 1 and 2.

Figure 5D:
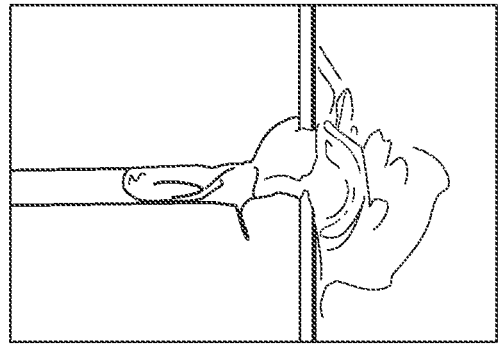
Figure 5E:
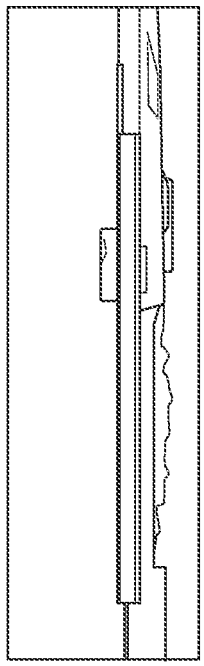
Figure 5B:
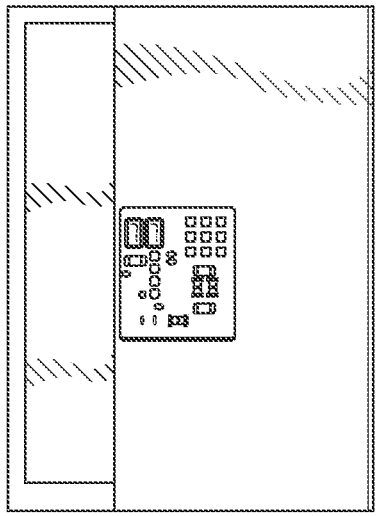
Figure 5C:
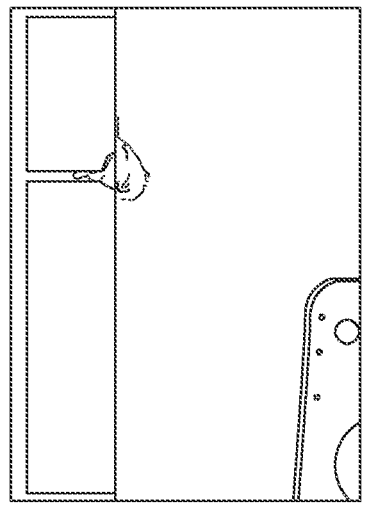
Figure 5F:
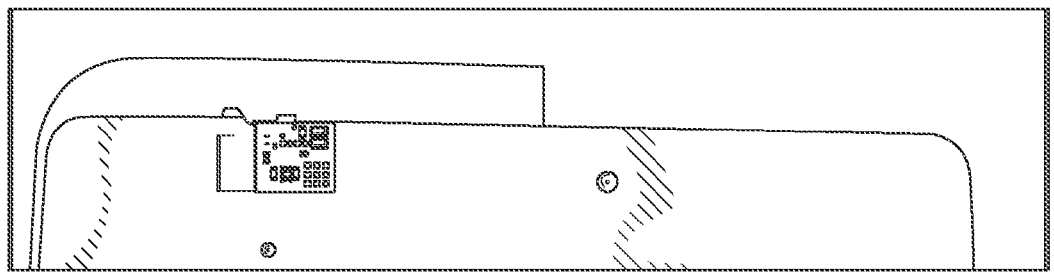
Figure 5G:
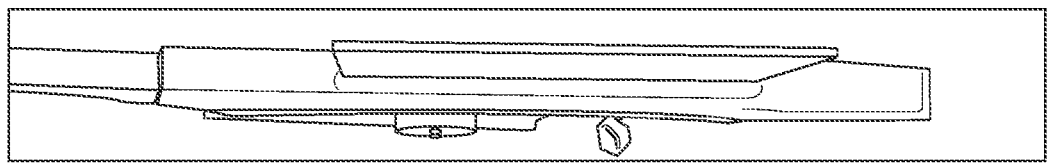
Figure 5H:
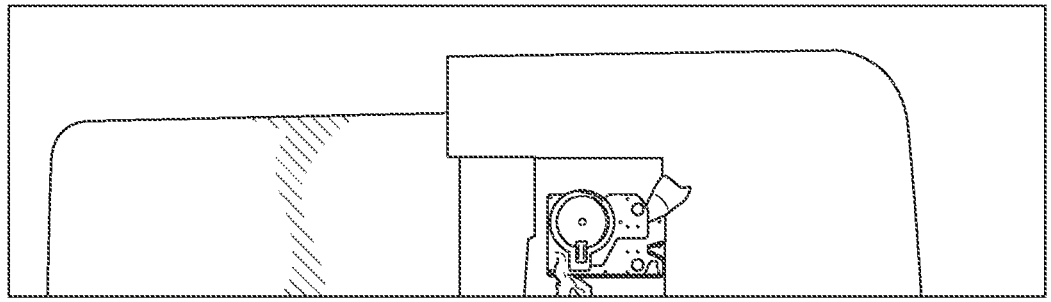

FIGS. 5A-5H illustrate photographs of a prototype of an exemplary WWAN antenna apparatus with integrated sensor according to one or more embodiments of the present disclosure. FIG. 5A illustrates the back side (e.g., a battery cover) of a chassis of size 216 mm×138 mm×6 mm on which the WWAN antenna apparatus with integrated proximity sensor is affixed. The proximity sensor shown in FIGS. 5A, 5B, and 5F is, in the illustrated embodiment, the Azoteq IQS229. FIGS. 5B and 5F illustrate various views of the back side of the chassis. FIGS. 5C and 5H illustrate the front side (e.g., display side) of the chassis. FIGS. 5D and 5G illustrate the top side of the chassis. FIG. 5E is a detailed view illustrating a capacitor coupled to ground and the proximity sensor contact point as shown in FIG. 5C. FIGS. 5B and 5C illustrate the antenna apparatus disposed on an antenna carrier of size 60 mm×11 mm×3 mm.

Figure 6:
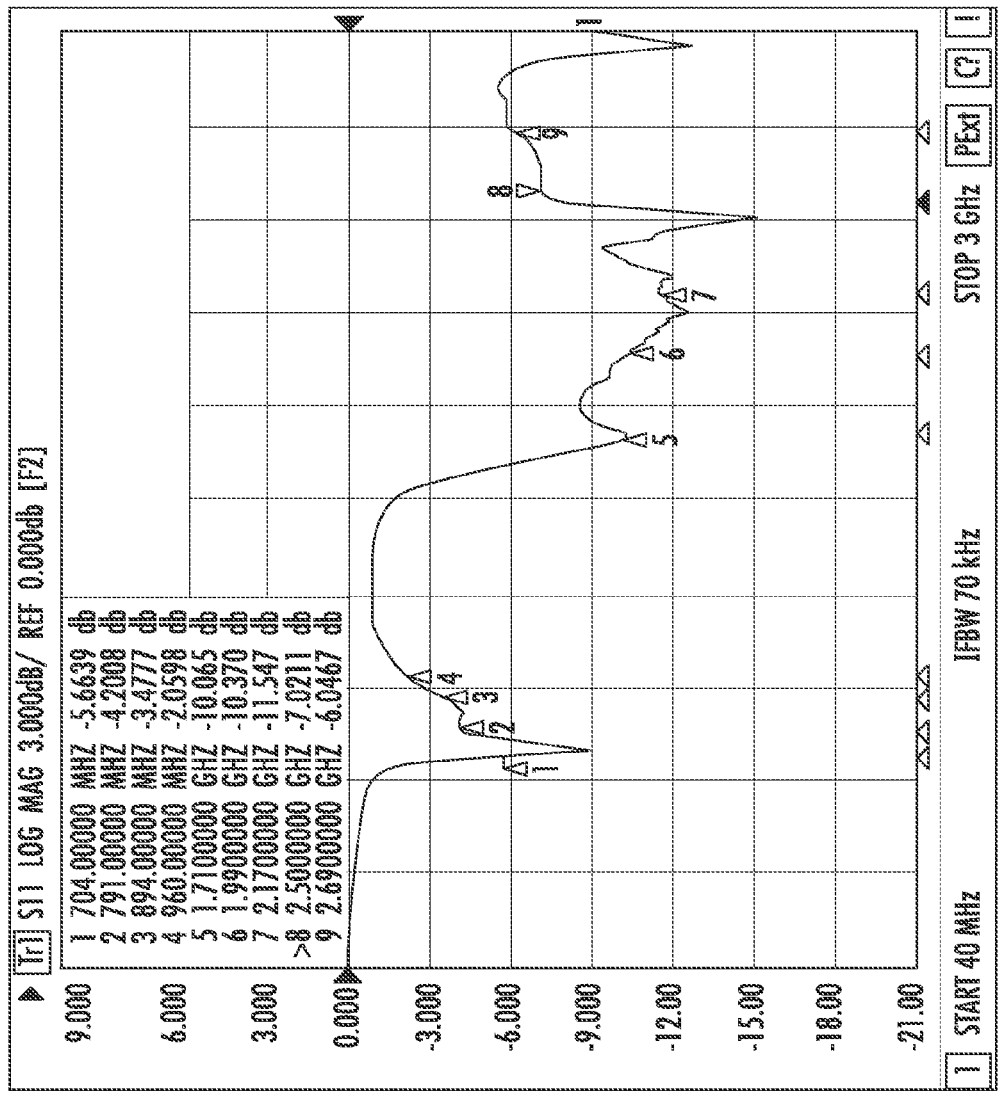
FIG. 6 is a chart illustrating, for example, free-space antenna return loss (in dB) as a function of frequency for the S11 antenna radiator.

FIG. 6 depicts the free-space antenna return loss (in dB) as a function of frequency for the antenna radiator as shown in, for example, FIGS. 5B and 5C. Specifically, the free-space antenna return loss is characterized at a number of different operational frequencies of interest. At 704 MHz, the free-space return loss is approximately −5.7 dB; at 791 MHz, the free-space return loss is approximately −4.2 dB; at 894 MHz, the free-space return loss is approximately −3.5 dB; at 960 MHz, the free-space return loss is approximately −2.1 dB; at 1.71 GHz, the free-space return loss is approximately −10.1 dB; at 1.99 GHz, the free-space return loss is approximately −10.4 dB; at 2.17 GHz, the free-space return loss is approximately −11.5 dB; at 2.50 GHz, the free-space return loss is approximately −7.0 dB; and at 2.69 GHz, the free-space return loss is approximately −6.0 dB.

Figure 7:
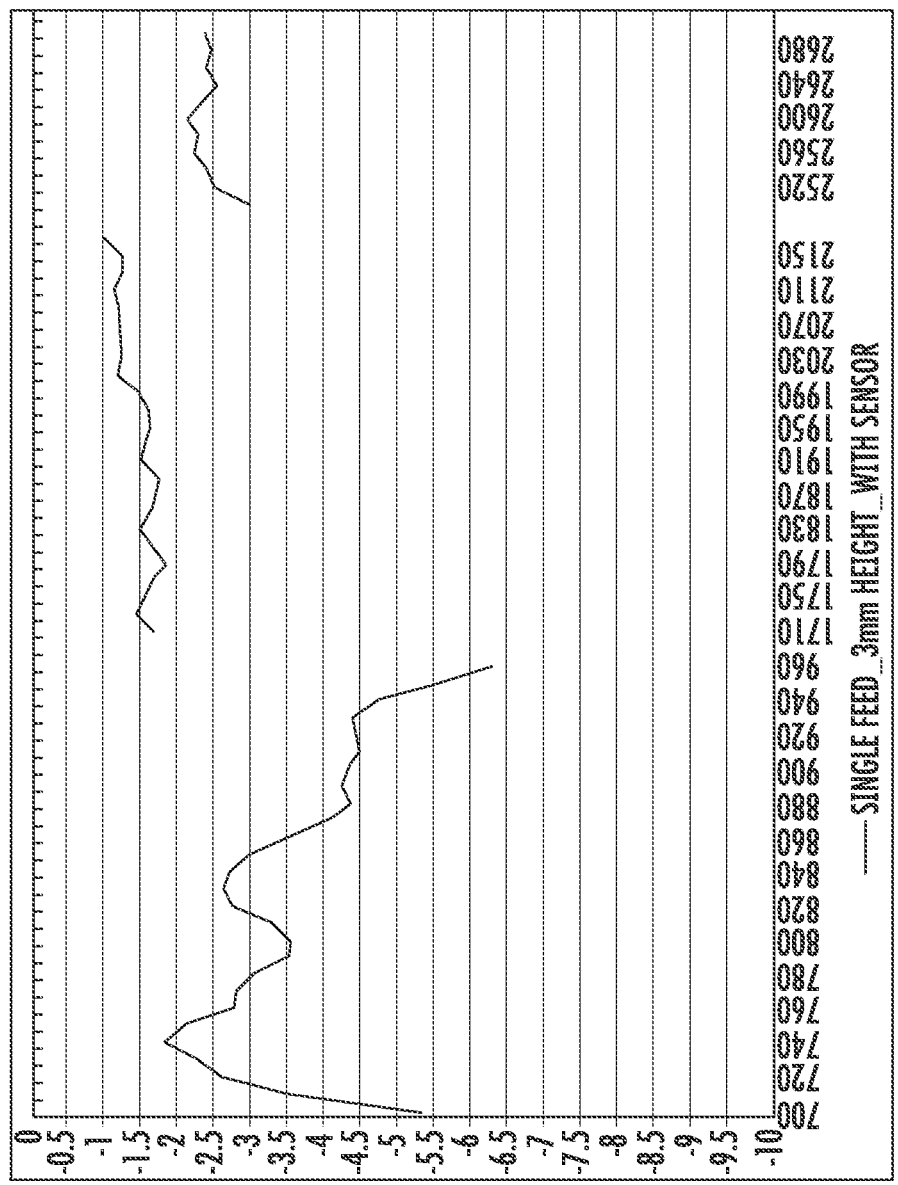
FIG. 7 is a chart illustrating, for example, free-space efficiency (in dB) obtained for the antenna shown in, for example, FIGS. 5B and 5C.

FIG. 7 presents data regarding free-space efficiency (in dB) obtained for the antenna shown in FIGS. 5B and 5C. Efficiency of an antenna (in dB) is may be defined decimal logarithm of a ratio of radiated to input power:

$$AntennaEfficiency = 10\log_{10}\left(\frac{\text{Radiated Power}}{\text{Input Power}}\right) \quad \text{(Eqn. 1)}$$

An efficiency of zero (0) dB corresponds to an ideal theoretical radiator, wherein all of the input power is radiated in the form of electromagnetic energy.

Figure 8:
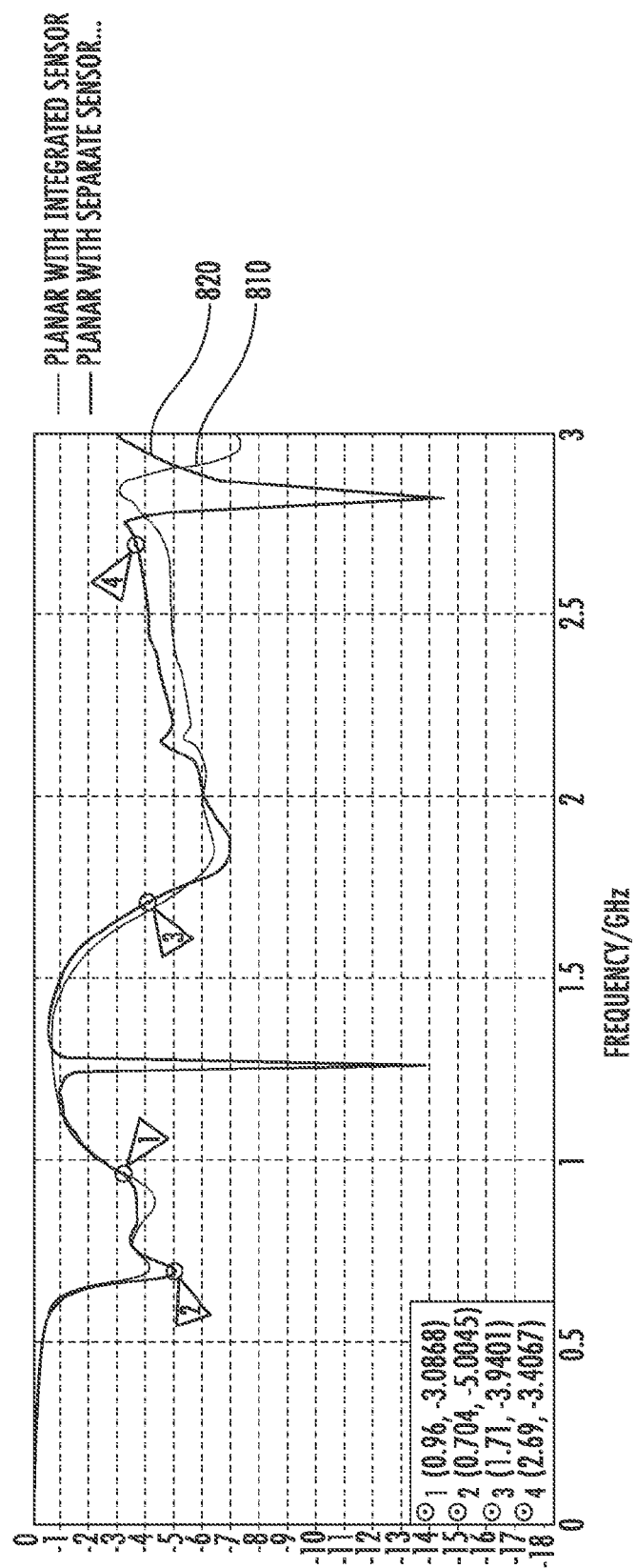
FIG. 8 is a chart illustrating, for example, return loss (in dB) as a function of frequency for the antenna arrangements shown in FIGS. 1 and 1A.

FIG. 8 illustrates return loss as a function of frequency for both: (1) the first exemplary embodiment of a WWAN antenna apparatus with an integrated proximity sensor as shown in FIG. 1; and (2) the first exemplary embodiment of a WWAN antenna apparatus with an integrated proximity sensor with a separate sensor element as shown in FIG. 1A. Specifically, curve 810 is associated with the embodiment illustrated and described previously herein with regards to FIG. 1, while curve 820 is associated with the embodiment illustrated and described previously herein with regards to FIG. 1A.

Figure 9:
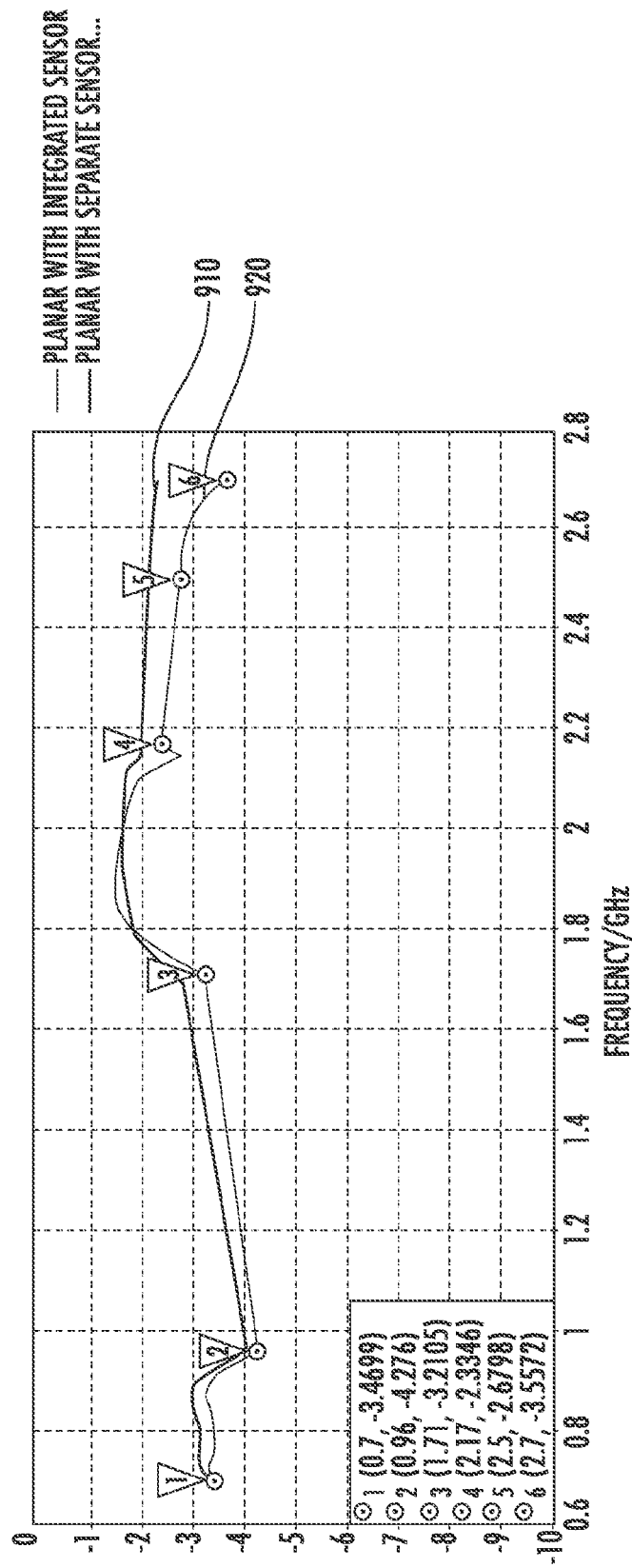
FIG. 9 is a chart illustrating, for example, total efficiency (in dB) as a function of frequency for the antenna arrangements shown in FIGS. 1 and 1A.

FIG. 9 illustrates total efficiency as a function of frequency for both: (1) the first exemplary embodiment of a WWAN antenna apparatus with an integrated proximity sensor as shown in FIG. 1; and (2) the first exemplary embodiment of a WWAN antenna apparatus with an integrated proximity sensor with a separate sensor element as shown in FIG. 1A. Specifically, curve 910 is associated with the embodiment illustrated and described previously herein with regards to FIG. 1, while curve 920 is associated with the embodiment illustrated and described previously herein with regards to FIG. 1A.

Figure 10:
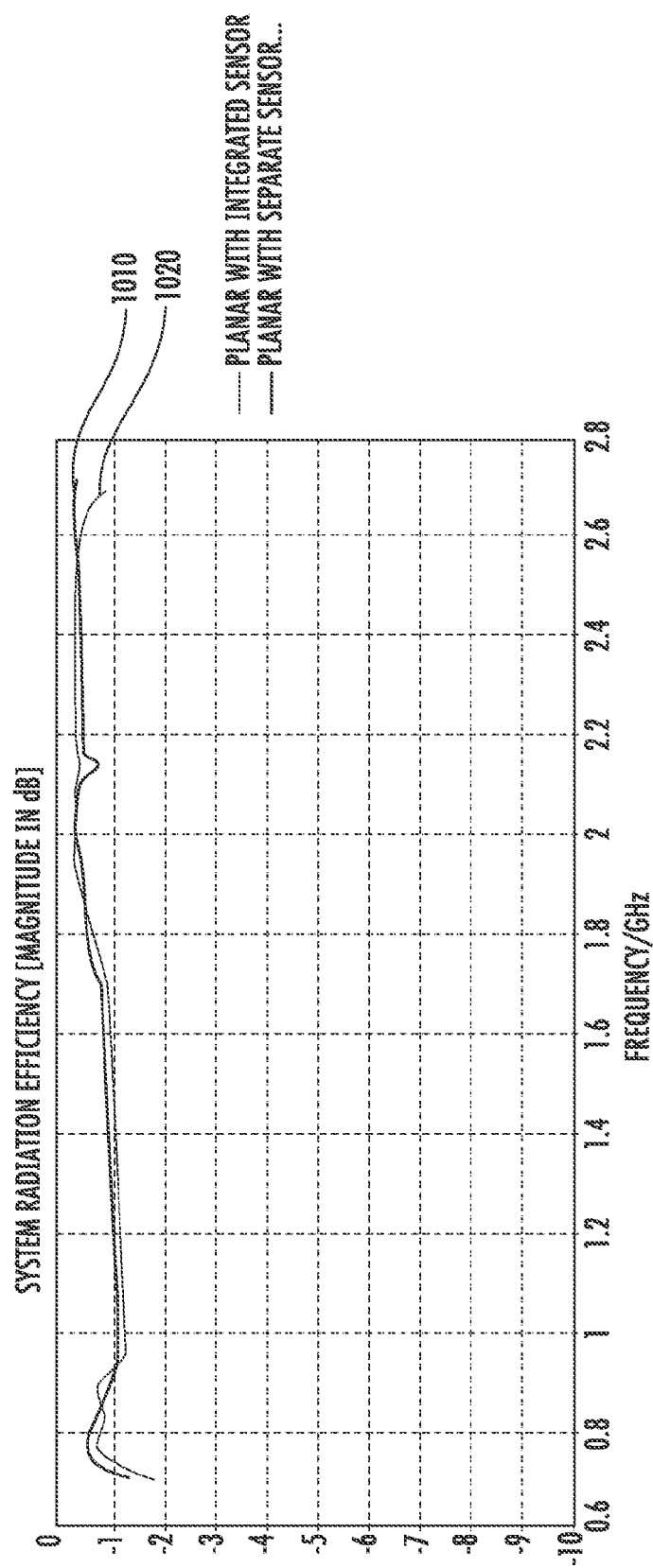
FIG. 10 is a chart illustrating, for example, radiation efficiency (in dB) as a function of frequency for the antenna arrangements shown in FIGS. 1 and 1A.

FIG. 10 illustrates radiation efficiency as a function of frequency for both: (1) the first exemplary embodiment of a WWAN antenna apparatus with an integrated proximity sensor as shown in FIG. 1; and (2) the first exemplary embodiment of a WWAN antenna apparatus with an integrated proximity sensor with a separate sensor element as shown in FIG. 1A. Specifically, curve 1010 is associated with the embodiment illustrated and described previously herein with regards to FIG. 1, while curve 1020 is associated with the embodiment illustrated and described previously herein with regards to FIG. 1A.

It will be recognized that while certain aspects of the present disclosure are described in terms of specific design examples, these descriptions are only illustrative of the broader methods of the disclosure, and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A method of operating an antenna with an integrated proximity sensor, the method comprising:
    detecting a change in capacitance at the proximity sensor via a discrete sensor element, the discrete sensor element being galvanically coupled to the integrated proximity sensor and capacitively coupled to a grounded antenna component;
    capacitively coupling the grounded antenna component with both the discrete sensor element and a feed element of the antenna;
    based, at least in part, on the detecting the change in capacitance by the proximity sensor, sending, from the proximity sensor, a message indicating a presence of a human body; and
    lowering a transmit power of the antenna based, at least in part, on a receipt of the message.

2. The method of claim 1, further comprising:
    detecting a second change in capacitance at the proximity sensor; and
    based, at least in part, on the detecting the second change in capacitance, sending, at the proximity sensor, a second message indicating an absence of the human body.

3. The method of claim 2, further comprising:
    lowering the transmit power of the antenna based, at least in part, on a receipt of the second message.

4. A mobile apparatus, comprising:
    a radio frequency engine;
    a proximity sensor coupled to the radio frequency engine;
    one or more antenna feed elements coupled to the radio frequency engine;
    a grounded antenna element; and
    a sensor element galvanically coupled with the proximity sensor and capacitively coupled to the grounded antenna element, the grounded antenna element also being capacitively coupled to the one or more antenna feed elements;
    wherein the one or more antenna feed elements and the grounded antenna element are disposed on a first surface of a substrate;
    wherein the sensor element is disposed on a second surface of the substrate, the second surface opposing the first surface.

5. The mobile apparatus of claim 4, wherein a contour for the sensor element generally mirrors a contour for the grounded antenna element.

6. The mobile apparatus of claim 5, wherein the substrate comprises a flexible printed circuit board.

7. The mobile apparatus of claim 4, wherein the proximity sensor is configured to detect a change in capacitance.

8. The mobile apparatus of claim 7, wherein the one or more antenna feed elements comprises a low band antenna feed element and a high band antenna feed element; and
    wherein the mobile apparatus further comprises a matching circuit disposed between the low band antenna feed element and the high band antenna feed element.

9. An antenna apparatus, comprising:
    one or more antenna feed elements;
    a parasitic element capacitively coupled to the one or more antenna feed elements, the parasitic element configured to broaden an impedance bandwidth of the one or more antenna feed elements;

a proximity sensor coupled to a processing engine; and a sensor element galvanically coupled to the proximity sensor and capacitively coupled to the parasitic element, the proximity sensor being configured to detect a change in capacitance in the parasitic element in a presence of a human body and further configured to lower an output power of at least one of the one or more antenna feed elements in response thereto, the proximity sensor configured to raise the output power of at least one of the one or more antenna feed elements in an absence of the human body.

10. The antenna apparatus of claim 9, wherein the proximity sensor is configured to lower or raise the output power of the one or more antenna feed elements via a signal sent to the processing engine.

11. The antenna apparatus of claim 10, wherein the proximity sensor is further configured to send the signal to the processing engine based on the detected change in capacitance in relation to a threshold capacitance value or a threshold time value.

12. The antenna apparatus of claim 9, further comprising a matching circuit configured to provide frequency tuning for the one or more antenna feed elements.

13. The antenna apparatus of claim 9, wherein the parasitic element comprises a radio frequency (RF) metallization.

14. The antenna apparatus of claim 13, wherein the parasitic element comprises a grounded metallization with a $\lambda/4$ element.

15. The antenna apparatus of claim 13, wherein the parasitic element comprises a floating metallization with a $\lambda/2$ element.

16. The antenna apparatus of claim 13, wherein the parasitic element comprises a dual-band parasitic element.

17. The antenna apparatus of claim 16, wherein the one or more antenna feed elements comprise a dual-band antenna feeding component.

18. The antenna apparatus of claim 9, wherein:

the sensor element is disposed on a first side of a substrate; and a contour for the sensor element generally following a contour for the parasitic element.

19. An antenna apparatus, comprising:

an antenna feed characterized by at least one resonating frequency;

a grounded antenna component configured to broaden an impedance bandwidth for the antenna apparatus, the grounded antenna component being capacitively coupled to the antenna feed;

a first sensing element capacitively coupled to the grounded antenna component such that the antenna feed and the first sensing element share the grounded antenna component;

a proximity sensor galvanically coupled to the first sensing element, the proximity sensor being configured to detect a change in capacitance in the grounded antenna component.

20. The antenna apparatus of claim 19, further comprising:

an RF controller;

wherein the proximity sensing element is configured to decrease or increase an output power of the antenna feed via a signal sent to the RF controller.

21. The antenna apparatus of claim 20, wherein the proximity sensor is further configured to decrease or increase the output power of the antenna feed via the signal to the RF controller when the detected change in capacitance crosses a threshold value or a minimum amount of time.

22. The antenna apparatus of claim 19, further comprising a matching circuitry element configured to provide frequency tuning of the antenna feed.

23. The antenna apparatus of claim 19, wherein the grounded antenna component comprises an RF metallization.

24. The antenna apparatus of claim 19, wherein the antenna feed comprises a dual-band antenna feeding component, and the grounded antenna component comprises a dual-band parasitic element.

25. The antenna apparatus of claim 19, wherein:

the antenna feed and the grounded antenna component are disposed on a first side of a substrate; and the first sensing element capacitively coupled to the grounded antenna component is disposed on a second side of the substrate opposite the first side.

* * * * *